(12) United States Patent
Lin

(10) Patent No.: US 8,005,635 B2
(45) Date of Patent: Aug. 23, 2011

(54) SELF-CALIBRATED AZIMUTH AND ATTITUDE ACCURACY ENHANCING METHOD AND SYSTEM (SAAAEMS)

(76) Inventor: Ching-Fang Lin, Simi Valley, CA (US)

( * ) Notice: Subject to any disclaimer, the term of this patent is extended or adjusted under 35 U.S.C. 154(b) by 102 days.

(21) Appl. No.: 12/228,754

(22) Filed: Aug. 14, 2008

(65) Prior Publication Data

US 2009/0089001 A1    Apr. 2, 2009

Related U.S. Application Data

(60) Provisional application No. 60/964,898, filed on Aug. 14, 2007.

(51) Int. Cl.
 *G01C 25/00* (2006.01)
 *G01C 19/00* (2006.01)
 *G01F 19/00* (2006.01)

(52) U.S. Cl. ......... 702/92; 702/93; 702/141; 73/503.3; 73/504.02; 73/504.03; 73/504.08; 73/504.18; 701/216

(58) Field of Classification Search ............ 702/92, 702/93, 141; 342/357.11, 357.14; 73/503.3, 73/504.02, 504.03, 504.08, 504.18; 701/216
 See application file for complete search history.

(56) References Cited

U.S. PATENT DOCUMENTS

2006/0038718 A1* 2/2006 Arakane et al. .......... 342/357.11
* cited by examiner

*Primary Examiner* — Sujoy K Kundu
(74) *Attorney, Agent, or Firm* — Raymond Y. Chan; David and Raymond Patent Firm

(57) ABSTRACT

A method and system for Self-calibrated Azimuth and Attitude Accuracy Enhancing are disclosed, wherein SAAAEMS approach is based on fully auto-calibration self-contained INS principles, not depending on magnetometers for azimuth/heading determination, and thus the system outputs and performance are not affected by the environmental magnetic fields. In order to reduce the system size and cost, this new innovative methods and algorithms are used for SAAAEMS system configuration and integration. Compared to a conventional INS for gyrocompassing, AGNC's approach uses a smaller number of high accuracy sensors: SAAAEMS uses only one 2-axis high accuracy gyro (for example, one DTG) instead of 3-axis; the third axis gyro is a MEMS gyro. It uses only 2 high accuracy accelerometers instead of 3, since the two accelerometers are used only for gyrocompassing not for navigation. These two changes to the conventional INS system configuration remarkably reduce the whole system size and cost. SAAAEMS, uses dynamic gyrocompassing processing for isolation of Base motion disturbance/interference and vibration. SAAAEMS provides a method and system for using automatic methods for system calibration.

12 Claims, 8 Drawing Sheets

SELF-CALIBRATED AZIMUTH AND ATTITUDE ACCURACY ENHANCING METHOD AND SYSTEM (SAAAEMS)

CROSS REFERENCE OF RELATED APPLICATION

This is a regular application of a provisional application having an application number of 60/964,898 and a filing date of Aug. 14, 2007.

BACKGROUND OF THE PRESENT INVENTION

1. Field of Invention

The present invention relates to an innovative human-portable Self-calibrated Azimuth and Attitude Accuracy Enhancing Method and System (SAAAEMS) for a human-portable, tripod mounted, or handheld pointing system. The technical approach of the SAAAEMS implementation is based on an innovative gyrocompassing method of an inertial navigation system (INS). This SAAAEMS approach is based on fully auto-calibration self-contained INS principles, not depending on magnetometers for azimuth/heading determination, and thus the system outputs and performance are not affected by the environmental magnetic fields. This SAAAEMS is not a conventional strapdown INS. In order to reduce the system size and cost, this new innovative methods and algorithms are used for SAAAEMS system configuration and integration. Compared to a conventional INS for gyrocompassing, American GNC Corporation's (AGNC) approach uses a smaller number of high accuracy sensors: SAAAEMS uses only one 2-axis high accuracy gyro (for example, one DTG) instead of 3-axis; the third axis gyro is a MEMS gyro. It uses only 2 high accuracy accelerometers instead of 3, since the two accelerometers are used only for gyrocompassing not for navigation. These two changes to the conventional INS system configuration remarkably reduce the whole system size and cost. These 2-DOF inertial angular rate measurements and 2-DOF acceleration (gravity) measurements are adequate for the SAAAEMS gyrocompassing process that will determine the azimuth with respect to true north and the module's vertical attitude (elevation/pitch and roll). The third MEMS gyro enables the SAAAEMS to work in the dynamic state.

2. Description of Related Arts

The SAAAEMS is applicable to a broad range of pointing, control and navigation systems. Many traditional approaches and systems can be used for pointing, but they have disadvantages. An extensive survey of the existing methodologies corresponding to pointing, target acquisition, attitude determination, geolocation and processing has been performed by the inventor. A brief description of the related and existing technology survey is presented next.

High-Accuracy triad or 2 accelerometers for vertical angle measurement. This is a conventional approach based on the measurement of the earth's gravity to determine the sensor frame's attitude with respect to the gravitational force direction. At present, the high-end MEMS accelerometers can achieve an accuracy of 1 to 2 mils on a stationary base.

High-Accuracy triad magnetometers data for azimuth measurement usually need to be combined with the accelerometer data to obtain accurate azimuth at different elevation/tilt angles. The advantage of the magnetometers is that the sensor module size can be very small and it is also of low cost. The downside of the magnetometers is that they can be easily interfered with by magnetic or ferrous objects, such as buildings, vehicles, power lines, buried pipes and even a soldier's individual combat load. At present, the best digital magnetometers can achieve a heading accuracy of 0.5 degrees, under ideal application environment and with good calibration and compensation, including magnetic declination angle compensation. Higher accuracy and reliability for the magnetometer heading measurement is very difficult to obtain currently.

Use IMU (inertial measurement unit, consists of 3 gyros and 3 accelerometers) to measure azimuth, pitch/elevation, and roll angles through the conventional gyrocompassing approach. The first advantage of this approach is that it is autonomous or self-calibrated. It is not affected by magnetic fields and needs no external information, such as initial conditions or external reference. Traditionally, the required high accuracy gyros and accelerometers are expensive and big in size. The technology advancements in the past 10 years have transformed the inertial sensors, especially the advances of the MEMS inertial sensor. Also, advanced processing algorithms and real-time calibration methods realized by powerful computers/microprocessors can lower the accuracy requirements for the sensors. However, at present, the MEMS gyros are not accurate enough for the gyrocompassing approach and the conventional implementation based on high accuracy (usually inertial grade or better) gyros can be too expensive and oversized for a handheld system.

Use of a GPS attitude determination approach to measure azimuth and pitch/elevation angles. This method leads to an inexpensive system. However, its size can not be small with current technologies. It needs at least 2 separated GPS antennas and their separation may need to be 2 to 3 meters. Also, it is not self-contained. If the GPS signals are blocked or jammed, the system fails.

Reference point method. This method needs a DGPS receiver and the laser ranger finder needs to be mounted on an angular header to perform accurate relative angle measurements (goniometer). To determine the azimuth of any target, the user must establish a reference baseline first. An object is chosen as the survey control point with coordinates determined by the DGPS to an accuracy of 10 to 20 cm. Then the Accurate Heading (AH) system is positioned at a separate point and the true azimuth of the line between the two points is obtained by their DGPS-provided geographical positions. Using this baseline as a reference the true north azimuth of the target is determined. The disadvantage of this method is that it is not convenient and not suitable for mobile applications.

If used on a dynamic moving platform, the Coremicro® AHRS/INS/GPS unit (AINSGPS) can also provide accurate heading and attitude angle measurements. Unfortunately, with the use of the AH system most of the time on stationary or slow moving platforms (such as with a handheld binocular laser ranger finder), this approach is not suitable for the AH system application.

The advantage of the magnetometers is that the sensor module size can be very small and it is also of low cost. The downside of the magnetometers is that they can be easily interfered with by magnetic or ferrous objects, such as buildings, vehicles, power lines, buried pipes and even a soldier's individual combat load. At present, the best digital magnetometers can achieve a heading accuracy of 0.5 degrees, under ideal environment and with good calibration and compensation, including magnetic declination angle compensation. Higher accuracy and reliability for the magnetometer heading measurement is very difficult to obtain currently. The GPS attitude determination approach leads to an inexpensive system. However, its size can not be small with current technologies. It needs at least 2 separated GPS antennas and their separation may need to be 2 to 3 meters. Also, it is not self-contained. If the GPS signals are blocked or jammed, the system fails.

Based on the existing technology surveys and careful trade-off studies, we have established a good justification for the invention of AGNC's non-magnetometer gyrocompassing-based Self-calibrated Azimuth and Attitude Accuracy Enhancing Method and System (SAAAEMS) technology. It uses only one 2-axis tactical-grade gyro instead of a three-axis navigation grade IMU, plus one MEMS gyro, and two MEMS accelerometers, for attitude and azimuth determination.

The SAAAEMS is based on gyrocompassing approaches. Gyrocompassing is a fundamental method for INS initial alignment. It is a self-contained alignment mainly for ground-based applications. The key advantage of this approach is that it is autonomous or self-calibrated. It is not affected by magnetic fields and needs no external information, such as initial conditions or external reference. Traditionally, the high accuracy gyros and accelerometers are expensive and big in size. But the technology advancements in the past 10 years have transformed the inertial sensors, especially the advances of the new technology based inertial sensors, such as Hemispherical Resonator Gyros (HRG), MEMS quartz (vibration) gyros and MEMS quartz accelerometers. The small 2-axis tactical or inertial grade dynamically tuned gyros (DTG) are also suitable for the AH systems. Also, advanced processing algorithms and real-time calibration methods realized by powerful computers/microprocessors can lower the accuracy requirement for the sensors.

For SAAAEMS implementation, we use a 2-axis DTG gyro in the SAAAEMS system because it is much smaller than a FOG gyro with the same accuracy. Compared to RLG and FOG, the DTG may not be best in accuracy and robustness, but for most applications, such as the SAAAEMS system, it still has more advantages:

Small size
Low cost
Adequate accuracy, if properly modeled and compensated/calibrated.

Our SAAAEMS system also has a third MEMS gyro to enhance system dynamic (angular motion) performance. This SAAAEMS system features small size, low cost, low power consumption, and easy automatic calibration, with satisfactory accuracy.

SUMMARY OF THE PRESENT INVENTION

The main objective of the present invention is to provide a method and system of an innovative human-portable Self-calibrated Azimuth and Attitude Accuracy Enhancing Method and System (SAAAEMS) for a human-portable, tripod mounted, or handheld pointing system.

Another objective of the present invention is to provide a method and system for SAAAEMS, which is based on an innovative gyrocompassing method of an INS. This SAAAEMS approach is based on fully auto-calibration self-contained INS principles, not depending on magnetometers for azimuth/heading determination, and thus the system outputs and performance are not affected by the environmental magnetic fields.

Another objective of the present invention is to provide a method and system for SAAAEMS, which uses only one 2-axis high accuracy gyro (for example, one DTG) instead of 3-axis; the third axis gyro is a MEMS gyro. It uses only 2 high accuracy accelerometers instead of 3, since the two accelerometers are used only for gyrocompassing not for navigation.

Another objective of the present invention is to provide a method and system for SAAAEMS, which is applicable to a broad range of pointing, control and navigation systems.

Another objective of the present invention is to provide a method and system for SAAAEMS, which is uses static gyrocompassing for initialization of the unit attitude and azimuth.

Another objective of the present invention is to provide a method and system for SAAAEMS, which is uses dynamic gyrocompassing processing for isolation of base motion disturbance/interference and vibration.

Another objective of the present invention is to provide a method and system for SAAAEMS, which uses closed-loop feedback control method for attitude and azimuth updating.

Another objective of the present invention is to provide a method and system for SAAAEMS, which uses automatic methods for system calibration.

These and other objectives, features, and advantages of the present invention will become apparent from the following detailed description, the accompanying drawings, and the appended claims.

DETAILED DESCRIPTION OF THE PREFERRED EMBODIMENT

SAAAEMS is a system and a suite of system approaches, test and calibration methods and signal processing algorithms. The SAAAEMS innovative gyrocompassing method is implemented on a standard or simplified strapdown INS as a gyrocompass or azimuth and vertical angle measurement system. It is based on fully auto-calibration self-contained INS principles, not depending on magnetometers for azimuth (heading) determination. Therefore, the SAAAEMS system outputs and performance are not affected by the magnetic fields of the environment.

Figure 1:
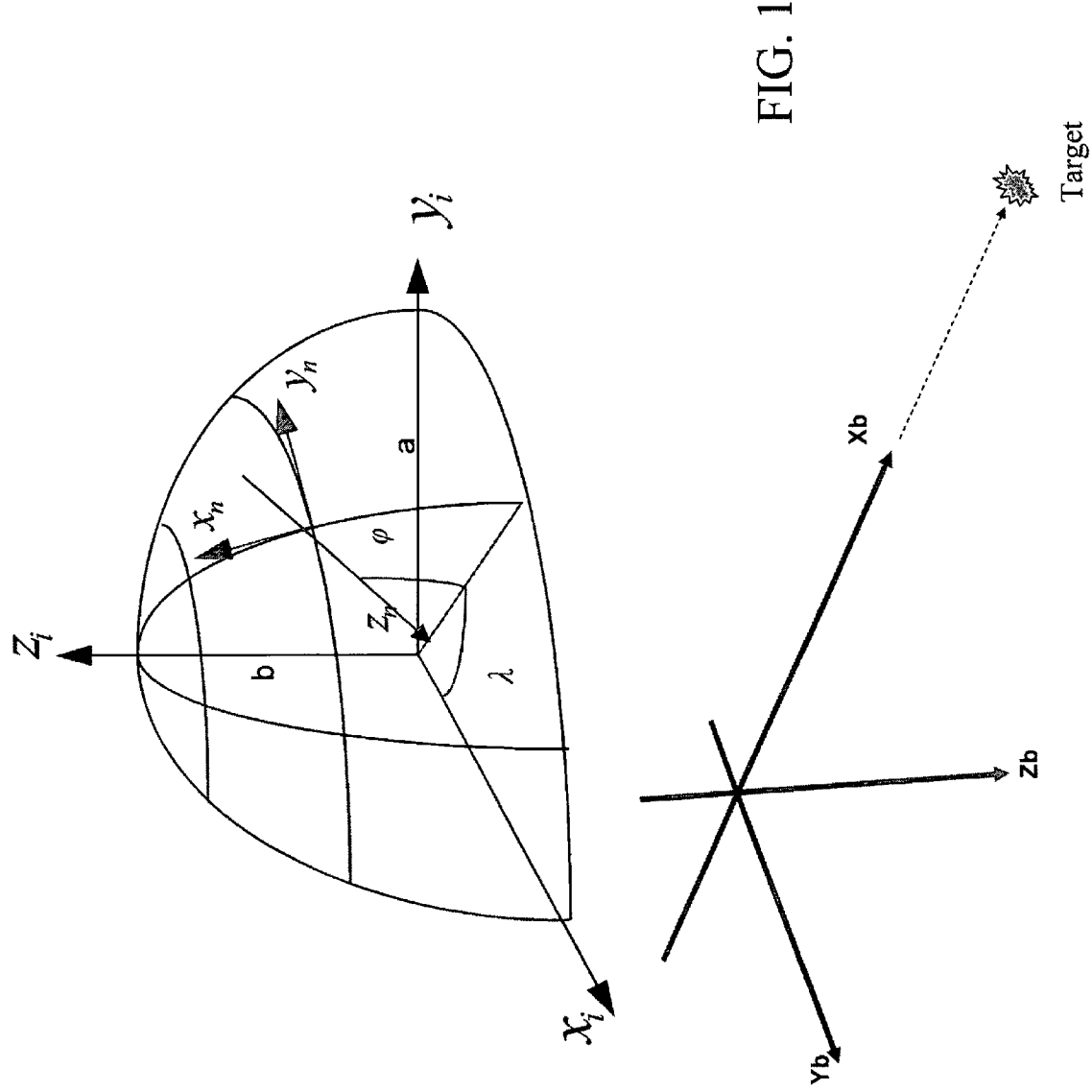
FIG. 1 depicts the SAAAEMS Coordinate Systems.

In the SAAAEMS system, gyrocompassing is used to determine the initial attitude of the IMU frame (it is in fact the SAAAEMS unit Body frame, called B frame) with respect to the navigation frame (N frame, the local geographic frame, adopted as the NED coordinate system). The mechanization of the INS is implemented in the navigation coordinate system (N). That is, the navigation solutions or parameters of the INS are referred to the N frame. The N frame is located at a point on the earth's surface. In order to define the N frame, a standard symmetric ellipsoid must be introduced. In the SAAAEMS unit, we adopt the WGS-84 as our reference ellipsoid. FIG. 1 depicts the definition and relation of three frames.

I—earth inertial frame
N—navigation frame, or local geographical frame
B—body frame or unit frame The body coordinate system may have many definitions. In the SAAAEMS system, the body coordinate system, as shown in FIG. 1, is defined as:

Xb—pointing to the front of the SAAAEMS unit. This is the same as the laser beam pointing direction of the laser ranger finder.

Yb—pointing to the right of the SAAAEMS unit.

Zb—pointing down and perpendicular to the Xb-Yb plane.

Three Euler angles between the Navigation and the Body frame determine the body's attitude. They are the roll, pitch and heading angles.

The attitude determination range for the SAAAEMS configuration is:

Elevation/Pitch—(−90°, 90°) with singular points at ±90°. Fully covers the pitch definition range.

Roll—(−90°, 90°). The full roll definition range is (−180°, 180°). The roll angle is not used on most pointing devices, but the SAAAEMS unit needs it for system solution.

Azimuth/Heading—[0°, 360°]. Fully covers the Heading definition range.

The SAAAEMS Prototype Hardware Configuration

Figure 2:
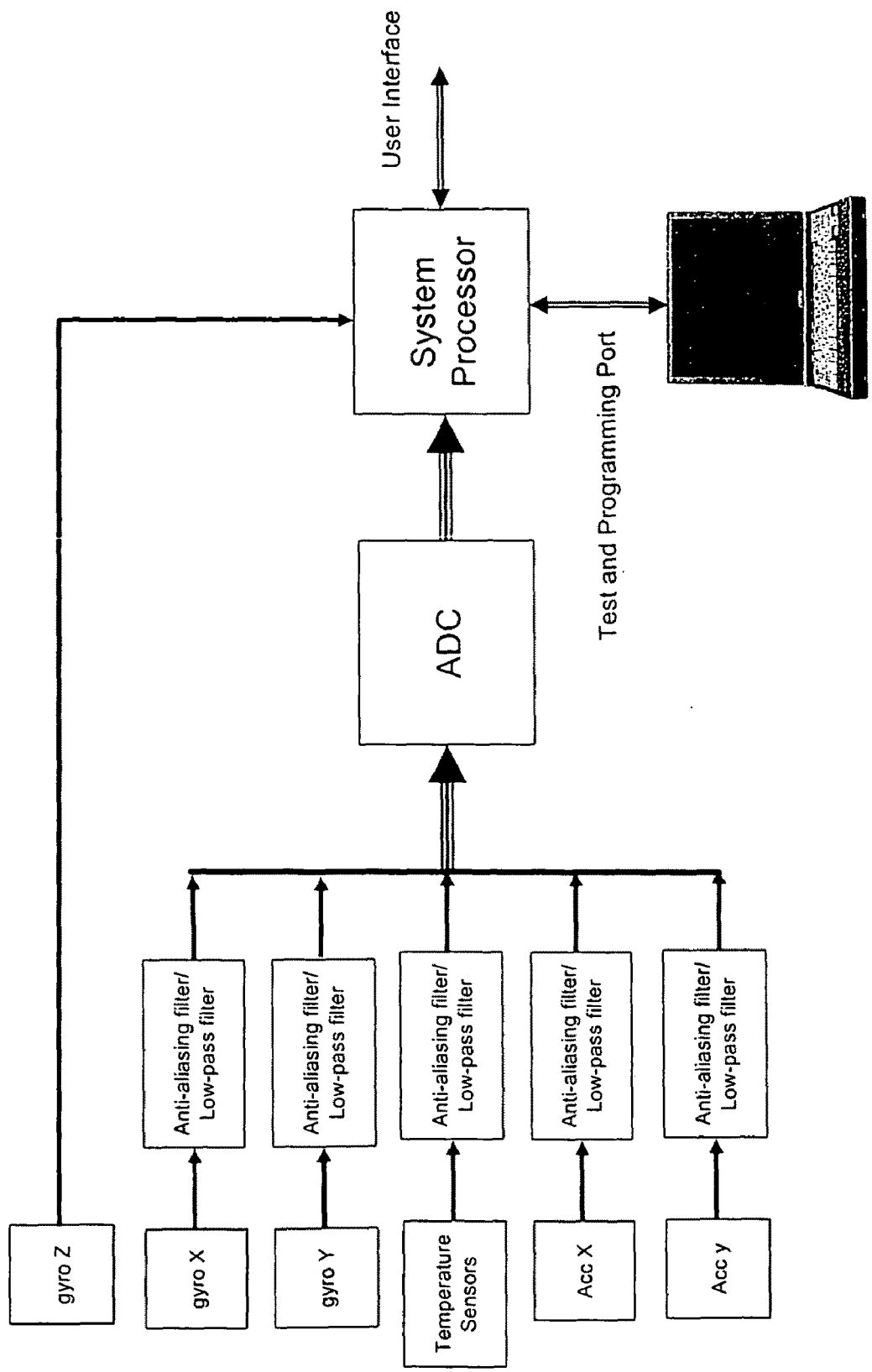
FIG. 2 is a block diagram illustrating SAAAEMS Prototype Hardware Configuration.

Referring to FIG. 2, an embodiment of the present invention based on the SAAAEMS system configuration comprises: a 2-axis DTG 1; two single-axis accelerometers 2; a single axis MEMS gyro 3; one or more sensor signal filters 4; an ADC circuits 5; one or more sensor interfaces 6; a microprocessor/microcontroller 7; a user interface 8; and a local and/or remote display unit 9.

In order to reduce the system size and cost, new innovative methods and algorithms are used for the system configuration and integration. Compared to a conventional INS for gyrocompassing, the SAAAEMS uses a smaller number of high accuracy sensors:

Uses only 2 high accuracy gyros (or one 2-axis gyro) instead of 3; the third gyro is a MEMS gyro.

Uses only 2 high accuracy accelerometers instead of 3, since the accelerometers are used only for gyrocompassing not navigation.

These two changes to the system configuration remarkably reduce the whole system size and cost. Two high accuracy rate gyros (or a two-axis rate gyro) and two high accuracy accelerometers are the core sensors of the SAAAEMS system. These 2-DOF inertial angular rate measurements and 2-DOF acceleration (gravity) measurements are adequate for the SAAAEMS gyrocompassing process that will determine the azimuth with respect to true north and the module's vertical attitude (elevation/pitch and roll). The SAAAEMS system also has a third MEMS gyro that enables the SAAAEMS to work in the dynamic state. That is, after the gyrocompassing process determines the initial azimuth and attitude, the system can work in an inertial AHRS (attitude and heading reference system) mode (or more precisely, inertial angular integration mode) and determine the changing azimuth and attitude, when the targeting SAAAEMS system is in angular motion. Thus, in practical use, the SAAAEMS system works in two modes, the gyrocompassing mode and the inertial AHRS mode:

The gyrocompassing mode is used for system initialization and re-calibration when the SAAAEMS unit is stationary or tracking a stationary target.

The inertial AHRS mode is used to provide azimuth and attitude when the system is in motion or is tracking a moving target.

An intelligent algorithm is developed to detect and determine the system motion state and automatically switch the SAAAEMS system between the two working modes accordingly.

The intermittent gyrocompassing mode eliminates the SAAAEMS angular errors accumulated during the inertial AHRS mode, which are caused mainly by the less accurate third MEMS gyro.

Figure 3:
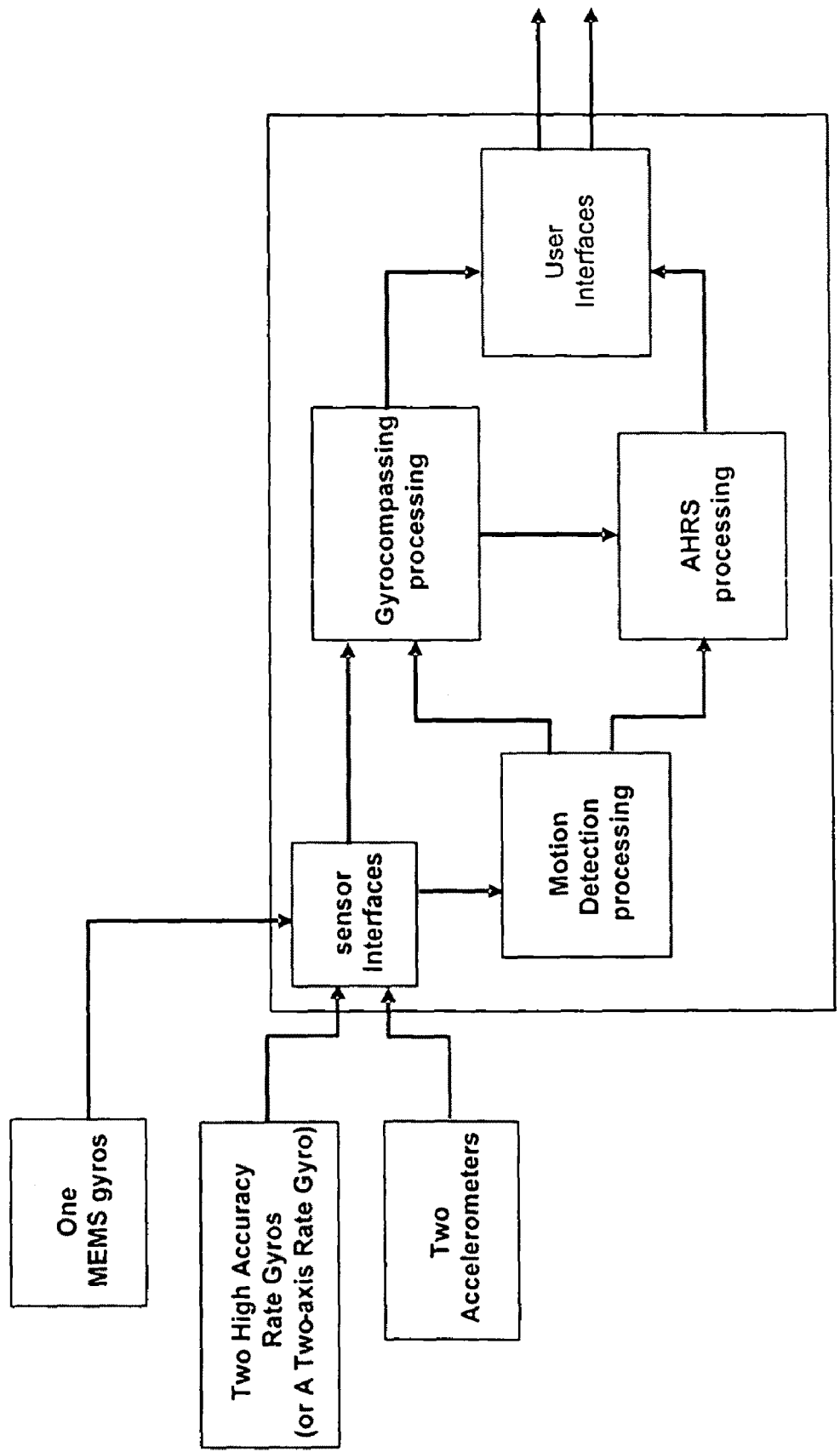
FIG. 3 is a block diagram illustrating SAAAEMS System Processing Configuration.

The configuration of the processing implementation is depicted in FIG. 3.

The use of the SAAAEMS system is very simple and comprises following steps:

1. When SAAAEMS is starting, it is left stationary for about 2 minutes to let it work in the gyrocompassing mode and get true north and elevation for system initialization. An indicator will let the user know when gyrocompassing is complete for system initialization.
2. Then, SAAAEMS will work in the AHRS mode and the user can hold SAAAEMS in his/her hand with the whole targeting system.
3. The user can then move the targeting system from pointing to one target to another, for multiple targets acquisition, continually, without pause and the SAAAEMS system provides real-time continuous target azimuth and elevation data.
4. If the SAAAEMS system detects a stationary phase time period, it will automatically perform a gyrocompassing procedure to refresh the system with the newly obtained azimuth and elevation.

Attitude Expression Methods

The major function of the SAAAEMS is to provide accurate elevation and azimuth angle measurements for a handheld or tripod-mounted pointing system. When the SAAAEMS unit is rigidly mounted on or embedded into a pointing system, the measurement of the elevation and azimuth angles is equivalent to the attitude (including azimuth) determination of the SAAAEMS unit (a rigid body). The SAAAEMS attitude is mathematically expressed in three sets of parameters: Euler angles, direction cosine matrix (DCM), and quaternion. In the SAAAEMS system, if any of the 3 attitude expressions is obtained, the other expressions can be calculated as well.

With a proper SAAAEMS unit installation with the pointing system, the relationship between the Euler angles and the elevation and azimuth angles can be:

Euler angle $\theta y$, the pitch angle=elevation angle;

Euler angle $\theta z$, the heading angle=azimuth angle;

Euler angle $\theta x$ the roll angle is not of concern in the pointing system, but necessary for the SAAAEMS system processing.

However, the Euler angle attitude expression is not efficient for the system processing since it will induce a lot of trigonometric functions computation and it has singular point at $\theta y=\pm 90$ degrees. Thus, inside the system processing the attitude is often expressed in the form of a direction cosine matrix (DCM) or quaternions.

The Euler angles express the body (unit, B frame) attitude with respective to the local geographical coordinate system (N frame) with 3 parameters. Similarly, the DCM expresses the attitude with 9 parameters, and the quaternions do the same thing with 4 parameters.

The DCM $C_n^b$ determines the B frame attitude with respective to the N frame and it is the transformation/rotation matrix between the B and N frames. That is for any vector V, its expressions on the B and N frames are related by the DCM $C_n^b$ as:

$$V^b = C_n^b V^n \text{ or } V^n = C_b^n V^b$$

The relationship between the DCM and the Euler angles is represented by the following equation:

$$C_n^b = \begin{bmatrix} c_{11} & c_{12} & c_{13} \\ c_{21} & c_{22} & c_{23} \\ c_{31} & c_{32} & c_{33} \end{bmatrix}$$

$$= \begin{bmatrix} \cos\theta y\cos\theta z & \cos\theta y\sin\theta z & -\sin\theta y \\ -\cos\theta x\sin\theta z + \sin\theta x\sin\theta y\cos\theta z & \cos\theta x\cos\theta z + \sin\theta x\sin\theta y\sin\theta z & \sin\theta x\cos\theta y \\ \sin\theta x\sin\theta z + \cos\theta x\sin\theta y\cos\theta z & -\sin\theta x\cos\theta z + \cos\theta x\sin\theta y\sin\theta z & \cos\theta x\cos\theta y \end{bmatrix}$$

(1 where θx is the roll angle; θy is the pitch angle; and θz is the heading angle.

The quaternions yield another attitude expression between the B frame with respective to the N frame. Since they have only 4 parameters and no singular point, they are often used for attitude updating computation. The attitude updating algorithm is much more efficient than the other attitude expression methods. The relationship between the Euler angles and the quaternions is determined by the following equations:

$cx = \cos(0.5*\theta x);$ $sx = \sin(0.5*\theta y);$ $cy = \cos(0.5*\theta y);$ $sy = \sin(0.5*\theta y);$ $cz = \cos(0.5*\theta z);$ $sz = \sin(0.5*\theta z);$ $p0 = cx*cy*cz + sx*sy*sz;$ $p1 = -sz*sy*cx + sx*cz*cy;$ $p2 = sy*cz*cx + sx*sz*cy;$ $p3 = sz*cy*cx - sx*sy*cz;$ (2 where p0, p1, p2, p3 are the elements of the corresponding quaternions.

The relationship between the quaternions and the DCM, $C_n^b$ is determined by following equations:

$C_{11} = 2*(q.p0*q.p0 + q.p1*q.p1) - 1;$ $C_{12} = 2*(q.p1*q.p2 + q.p0*q.p3);$ $C_{13} = 2*(q.p1*q.p3 - q.p0*q.p2);$ $C_{21} = 2*(q.p1*q.p2 - .p0*q.p3);$ $C_{22} = 2*(q.p0*q.p0 + q.p2*q.p2) - 1;$ $C_{23} = 2*(q.p2*q.p3 + q.p0*q.p1);$ $C_{31} = 2*(q.p1*q.p3 + q.p0*q.p2);$ $C_{32} = 2*(q.p2*q.p3 - q.p0*q.p1);$ $C_{33} = 2*(q.p0*q.p0 + q.p3*q.p3) - 1;$ (3

The relationship between the DCM, $C_n^b$, and the Euler angles is determined by the following equations, if no singularity occurs:

$\theta x = \arctg(C_{23}/C_{33});$ $\theta y = \arcsin(-C_{13});$ $\theta z = \arctg(C_{12}/C_{11});$ (4

Basic System Principles

Basically, the SAAAEMS is a suite of innovative gyrocompassing methods, implemented on a standard or simplified strapdown INS or an inertial measurement unit (IMU), as a gyrocompass or an azimuth and vertical angle measurement system. Gyrocompass and its technical concept (often called gyrocompassing) are not new, but in the SAAAEMS a suite of innovative system approaches, test and calibration methods, and signal processing algorithms are invented which make it a unique and outstanding gyrocompass system realization.

The basic principle of gyrocompassing is based on the measurement of the earth's angular velocity vector and the local gravity force vector. The early form of a gyrocompass is called a pendular gyroscope. It uses a 2 degrees-of-freedom (DOF) mechanical gyro to sense the earth angular motion and uses a pendulum attached to the gyro to sense the gravity force. Under the combined effects of earth motion, gravity force, and proper damping, the gyro rotational axis will converge to the true north.

In a platform gyrocompass system or a platform INS, the platform is stabilized by a gyro based closed-loop control system. By leveling the stabilized platform using the accelerometer outputs, the true heading of the platform can be obtained from the required command to the platform x and y axes, in order to cancel the effect of the earth's angular velocity. Equivalently, the earth's angular velocity is measured by the gyros on the leveled platform.

In a strapdown inertial measurement system, as in a strapdown inertial navigation system (SINS) or a SAAAEMS system, the inertial sensors are rigidly mounted onto the host system to measure the carrier motion directly. That is, rate gyros (such as DTG, FOG, RLG) are used to measure the carrier angular velocity and accelerometers are used to measure the specific force (caused by carrier acceleration and gravity).

The SAAAEMS system approach is based on measurement of the earth's angular velocity and local gravity. On the earth, measuring two physical vectors, the earth's angular velocity Ω and local gravity G, in a frame, such as in a sensor frame B, can determine the relative attitude between B and the local navigation frame, N, since the components of Ω and G in the N frame are known.

In principle 2D measurements are adequate for gyrocompassing on a stationary base. The third component can be reconstructed under certain conditions. In our system, a 2-axis DTG and two accelerometers are used. This approach reduces system size and cost remarkably.

In principle, a static and direct gyrocompassing (calculation) approach can use sensor outputs to obtain full attitude and true azimuth of the sensor unit (frame B). But in a practical system, this approach will be affected by base motion and sensor errors.

A static direct gyrocompassing can only be on a stationary base. Motion disturbance and sensor errors must be small enough, or the base motion will significantly affect system accuracy. For a tripod based application motion disturbance could be relatively small, but still needs to be considered and processed. For practical handheld applications, because the base motion is a normal state and can be significant, a dynamic gyrocompassing approach must be used for motion isolation and sensor errors must be compensated as well. Therefore in the SAAAEMS system approach, the processing for the base motion and sensor errors are of fundamental importance for system performance.

Figure 4:
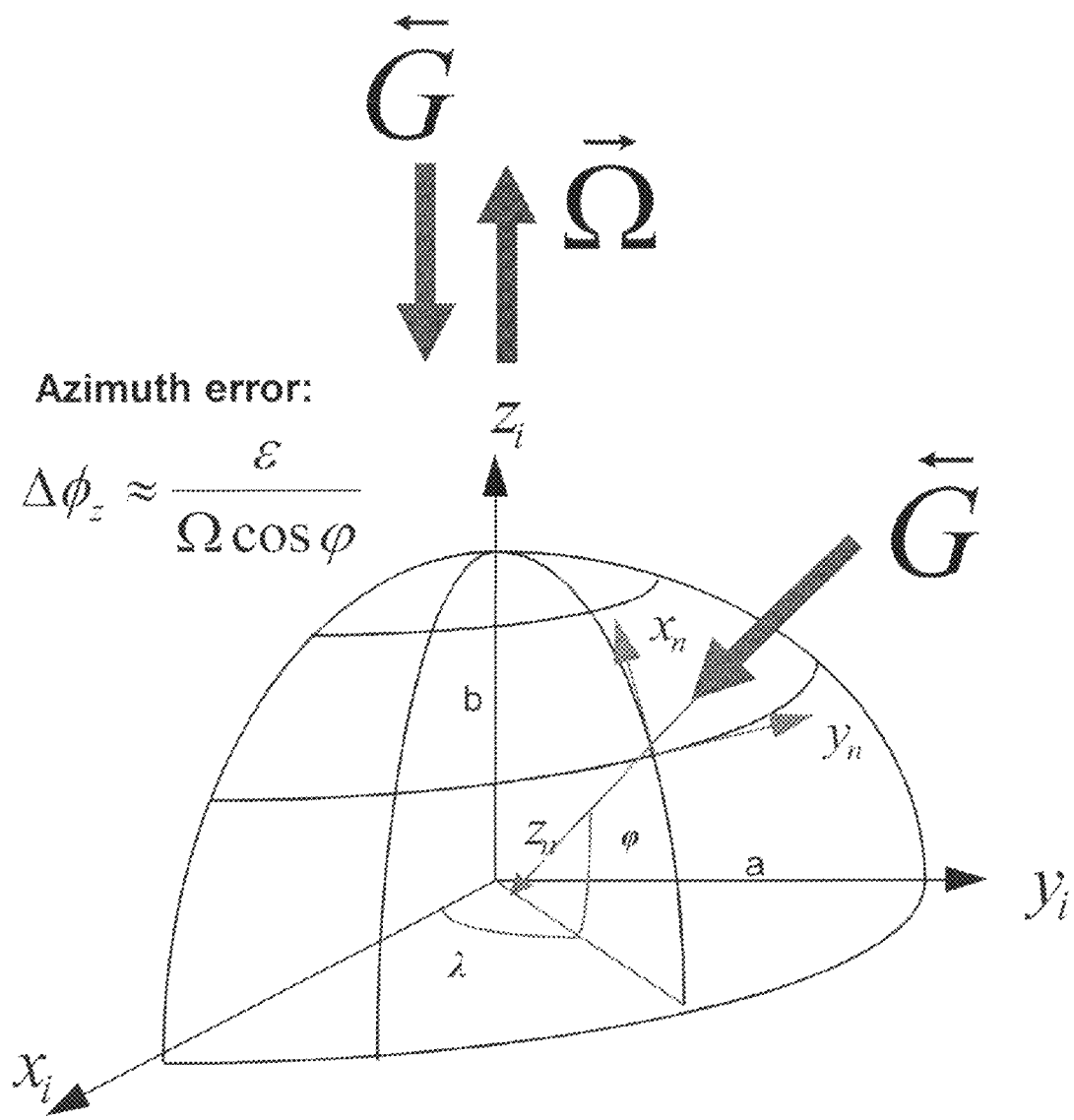
FIG. 4 depicts Gyros and accelerometers measurement for the SAAAEMS System.

Referring to FIG. 4, the gyrocompassing realization for a strapdown inertial system SAAAEMS is thus based on the direct measurement of the local gravity vector G and the earth's angular velocity vector $\Omega$ in the sensor frame B. The physical (or mathematical) meaning of the gyrocompassing is now even more obvious. That is, by measuring two constant physical vectors (G and $\Omega$) in two frames (N and B) we can determine the relative angular position between these two frames. A more basic law behind this method is that the attitude of a rigid body (or a frame) can be fully determined by two fixed vectors (or straight lines) in the rigid body, as long as these two vectors are not identical in direction. This poses a limitation for the gyrocompassing application: the two physical vectors G and $\Omega$ must not be identical in direction. On the earth's poles G and $\Omega$ will be identical in direction and thus the gyrocompassing approach will fail and in a practical system the accuracy of the gyrocompass will deteriorate in the polar areas.

The measurements of the local gravity vector G and the earth's angular velocity vector $\Omega$ in the B frame are carried out by gyros and accelerometers. In the N frame, however, the G and $\Omega$ vectors are known to us, as long as the local latitude is known (in practice, the latitude can be calculated from the outputs of gyros and accelerometers).

Now consider an ideal situation in which we have ideal sensors and the SAAAEMS or SAAAEMS unit is stationary on the ground. The G and $\Omega$ vectors expressed in the N frame are known:

$$G^n = \begin{bmatrix} 0 \\ 0 \\ g \end{bmatrix} \tag{5}$$

$$\Omega^n = \begin{bmatrix} \Omega\cos\varphi \\ 0 \\ -\Omega\sin\varphi \end{bmatrix} \tag{6}$$

where $\varphi$ is the local latitude, and g is the local gravitational acceleration.

In the B frame, the G and $\Omega$ vectors are measured by the gyros and accelerometers respectively. The ideal sensor outputs can be expressed as:

$$\omega_o = \omega_{bi}^b = C_n^b \Omega^n$$

$$f_o = f^b = C_n^b(-G^n) = -C_n^b(G^n) \tag{7}$$

where $C_n^b$ is the DCM between the B and N frames. It determines the B frame attitude with respective to the N frame. If $C_n^b$ is obtained, the attitude angles (including elevation and azimuth) will be determined.

In order to directly calculate $C_n^b$, we introduce an intermediate vector based on the G and $\Omega$ vectors: $I = -\Omega \times G = \Omega \times (-G)$. It is a non zero vector if $\varphi \neq \pm 90$ degrees. The vector I can be expressed in the N frame and B frame respectively:

$$I^n = -\Omega^n \times G^n = \Omega^n \times (-G^n)$$

$$I^b = -\Omega^b \times G^b = \Omega^b \times (-G^b) = f_o \times \omega_o \tag{8}$$

The expressions of the same vector I in the N frame and the B frame must satisfy:

$$I^b = C_n^b I^n \tag{9}$$

Combining the three vector equations we arrive at:

$$[\omega_{bi}^b f^b I^b] = C_n^b [\Omega^n - G^n I^n] \tag{10}$$

where $[\omega_{bi}^b f^b I^b]$ is a 3×3 matrix based on sensor outputs, and $[\Omega^n - G^n I^n]$ is a 3×3 matrix based on local gravity, latitude and earth rate. If $\varphi \neq \pm 90$ degrees, $[\Omega^n - G^n I^n]$ is a invertible and $C_n^b$ can be obtained as $$C_n^b = [\omega_{bi}^b f^b I^b][\Omega^n - G^n I_n]^{-1} \tag{11}$$

Thus, from the gyro and accelerometer outputs, the DCM $C_n^b$ is obtained, and then the unit's elevation and azimuth angles are determined.

From the above analysis, the basic principles of the SAAAEMS system are presented. And, we noticed that the 3 gyro sensors and 3 accelerometer sensors are used to measure vector components of G and $\Omega$ in the B frame.

$$\omega_o = \begin{bmatrix} \omega_{ox} \\ \omega_{oy} \\ \omega_{oz} \end{bmatrix} = \omega_{bi}^b = C_n^b \Omega^n = \Omega^b \tag{12}$$

$$f_o = \begin{bmatrix} f_{ox} \\ f_{oy} \\ f_{oz} \end{bmatrix} = f^b = C_n^b(-G^n) = -C_n^b(G^n) = -G^b \tag{13}$$

In fact, the amplitudes of the vector G and $\Omega$ are constant and known, respectively. Under the above ideal condition, the output components of gyros and accelerometers must satisfy the following constraints:

$$\sqrt{(\Omega_x^n)^2+(\Omega_y^n)^2+(\Omega_z^n)^2}=\sqrt{(\Omega_x^b)^2+(\Omega_y^b)^2+(\Omega_z^b)^2}=$$
$$\sqrt{(\omega_{ox})^2+(\omega_{oy})^2+(\omega_{oz})^2}=\Omega \tag{14}$$

$$\sqrt{(G_x^n)^2+(G_y^n)^2+(G_z^n)^2}=\sqrt{(G_x^b)^2+(G_y^b)^2+(G_z^b)^2}=$$
$$\sqrt{(f_{ox})^2+(f_{oy})^2+(f_{oz})^2}=g \tag{15}$$

This indicates that there is redundancy in the gyro and accelerometer measurements. The third gyro and the third accelerometer are not necessary for the realization of a gyrocompassing approach. From the prior knowledge of the gravity G and earth rate $\Omega$, and the two sensor measurements, the third sensor measurement can be estimated.

$$\omega_{oz} = \pm\sqrt{\Omega^2 - (\omega_{ox})^2 - (\omega_{oy})^2} \tag{16}$$

$$f_{oz} = \pm\sqrt{g^2 - (f_{ox})^2 - (f_{oy})^2} \tag{17}$$

In practice, if the roll angle of the unit is limited to ($-90°$, $+90°$), the ambiguity of the sign for the third sensor measurement calculation can be resolved.

Under ideal conditions, the inertial sensor outputs can also be expressed as a vector function of the Euler angles:

$$f_o = -C_n^b G^n = -C_n^b(\theta_x, \theta_y, \theta_y) G^n \tag{18}$$

$$\omega_o = C_n^b \Omega^n = C_n^b(\theta_x, \theta_y, \theta_z) \Omega^n \tag{19}$$

Re-writing in component form, we have:

$$f_{ox} = g \sin\theta_y$$

$$f_{oy} = -g \sin\theta_x \cos\theta_y$$

$$f_{oz} = -g \cos\theta_x \cos\theta_y \tag{20}$$

$$\omega_{ox} = \Omega \cos\varphi \cos\theta_y \cos\theta_z + \Omega \sin\varphi \sin\theta_y$$

$$\omega_{oy} = -\Omega \cos\varphi \cos\theta_x \sin\theta_z + \Omega \cos\varphi \sin\theta_x \sin\theta_y \cos\theta_z - \Omega \sin\varphi \sin\theta_x \cos\theta_y$$

$$\omega_{oz} = \Omega \cos\varphi \sin\theta_x \sin\theta_z + \Omega \cos\varphi \cos\theta_x \sin\theta_y \cos\theta_z - \Omega \sin\varphi \cos\theta_x \cos\theta_y \tag{21}$$

From the two accelerometer outputs $f_{ox}$ and $f_{oy}$, the elevation/pitch and roll angles can be calculated as:

$$\sin \hat{\theta}_y = f_{ox}/g \quad (22)$$

elevation/pitch: $\hat{\theta}_y = \arcsin(f_{ox}/g)$, where $\hat{\theta}_y \in (-90°, +90°)$ $$\cos \hat{\theta}_y = \sqrt{1-(\sin\hat{\theta}_y)^2} > 0 \quad (23)$$

roll: $\hat{\theta}_x = \arcsin(-f_{oy}/(g \cos \hat{\theta}_y))$, where $\hat{\theta}_x \in (-90°, +90°)$ The third accelerometer output $f_{oz}$ is not used. In fact, it can be constructed by using the outputs of $f_{ox}$ and $f_{oy}$:

$$\hat{f}_{oz} = -g \cos \hat{\theta}_x \cos \hat{\theta}_y \quad (24)$$

Based on the calculated elevation/pitch and roll angles, from two gyro outputs $\omega_{ox}$ and $\omega_{oy}$, the heading/azimuth angle can be calculated.

First from the gyro output $\omega_{ox}$ of the Eq. (1) we have:

$$\cos \hat{\theta}_z = (\omega_{ox} - \Omega \sin \varphi \sin \hat{\theta}_y)/\Omega \cos \varphi \cos \hat{\theta}_y \quad (25)$$

Then using the calculated $\cos \hat{\theta}_z$ and gyro output $\omega_{oy}$ we further obtain:

$$\sin \hat{\theta}_z = -(\omega_{oy} - \Omega \cos \varphi \sin \hat{\theta}_x \sin \hat{\theta}_y \cos \hat{\theta}_z + \Omega \sin \varphi \sin \hat{\theta}_x \cos \hat{\theta}_y)/\Omega \cos \varphi \cos \hat{\theta}_x \quad (26)$$

From the calculated $\cos \hat{\theta}_z$ and $\sin \hat{\theta}_z$ we can get the heading/azimuth angle at any point (0 to 360 degrees) without singularity from Eq. 25 and 26.

The third gyro output $\omega_{oz}$ is not used and it can be constructed by using the calculated Euler angles (obtained from two accelerometer outputs $f_{ox}$ and $f_{oy}$, and two gyro outputs $\omega_{ox}$ and $\omega_{oy}$):

$$\hat{\omega}_{oz} = \Omega \cos \varphi \sin \hat{\theta}_x \sin \hat{\theta}_z + \Omega \cos \varphi \cos \hat{\theta}_x \sin \hat{\theta}_y \cos \hat{\theta}_z - \Omega \sin \varphi \cos \hat{\theta}_x \cos \hat{\theta}_y \quad (27)$$

Thus, from the above analysis, it is demonstrated that, in principle, the 2 DOF sensor measurements of vectors G and Ω are also adequate for realization of a strapdown gyrocompass, and the 3 DOF sensor measurements can be constructed, under the ideal conditions.

In this invention SAAAEMS uses the static gyrocompassing for system initialization. The SAAAEMS system initialization comprises the following steps:
1. Power on the SAAAEMS system and position it on a stationary base.
2. Wait 2 to 3 minutes for gyros to fully start.
3. Perform ADC to get two channel gyro and two channel accelerometer measurement data.
4. Perform sensor calibration and error compensation for both two channel gyro and two channel accelerometer measurement data.
5. Perform low pass filtering for both two channel gyro and two channel accelerometer measurement data.
6. The filtered two channel gyro and two channel accelerometer measurement data are then used to calculate the initial SAAAEMS unit attitude and heading/azimuth. The initial SAAAEMS unit attitude and heading/azimuth can be calculated using two methods, the vector/matrix method or the triangle function method.
7. Repeat from step 3 and obtain real-time continuous SAAAEMS unit initial attitude and heading/azimuth, until the system enters into the dynamic gyrocompassing operation mode.

The SAAAEMS initialization vector/matrix method further comprises the following steps:
1. Use the local gravity and local earth velocity vectors to construct an intermediate vector $I^n$, referring to Eq. (8.
2. Use two channel gyro and two channel accelerometer measurement data to construct an intermediate vector $I^b$, referring to Eq. (8.
3. Use the local gravity and local earth velocity vectors and constructed intermediate vector $I^n$ to construct an intermediate matrix in the N frame, referring to Eq. (10.
4. Use the two channel gyro and two channel accelerometer measurement data and constructed intermediate vector $I^b$ to construct an intermediate matrix in the B frame, referring to Eq. (10.
5. Test the non-singularity of the constructed intermediate matrix in the N frame.
6. Use the constructed intermediate matrix in the N frame and the constructed intermediate matrix in the B frame to calculate the DCM of the B frame with respect to the N frame: referring to Eq. (11.
7. Use the DCM of the B frame with respect to the N frame to calculate the initial quaternion for the SAAAEMS attitude updating algorithms.

The SAAAEMS initialization with the triangle function method further comprises the following steps:
1. Scale the accelerometer X data.
2. Use scaled accelerometer X data to get the sine function of pitch angle, referring to Eq. (22.
3. Test if the absolute value of the scaled accelerometer X data is less than 1. If it is grater than 1, discard the data. It means that there is base disturbance or there is sensor error.
4. If the test is passed, used the sine function of the pitch angle to get the pitch angle value.
5. Calculate the cosine valued of the pitch angle.
6. Scale the accelerometer Y data.
7. Use scaled accelerometer Y data and the cosine value of the pitch angle to get the sine value of the roll angle.
8. Test if the absolute value of the sine value of the roll angle is less than 1. If it is grater than 1, discard the data. This means that there is base disturbance or there is sensor error.
9. If the test is passed, used the sine function of roll angle to get the roll angle value, referring to Eq. (23.
10. Use the gyro X measurement data, local geographical data, and the calculated cosine value and sine value of the pitch angle to get the cosine value of the cosine heading/azimuth value, referring to Eq. (25.
11. Use the gyro Y measurement data, local geographical data, the calculated cosine value and sine value of the roll angle, and the calculated cosine value and sine value of the pitch angle to get the sine value of the cosine heading/azimuth value, referring to Eq. (26.
12. Test if the absolute value of the sine value and cosine of the heading/azimuth angle is less than 1. If it is grater than 1, discard the data. This means that there is base motion disturbance or there is sensor error.
13. If the test is passed, perform the normalization of the sine value and cosine of the heading/azimuth angle, to reduce the error caused by sensor error or computation.
14. Use the sine value and cosine of the heading/azimuth angle to get the full range (0, 360) degrees heading/azimuth angle.
15. Use the calculated heading/azimuth angle, roll angle and pitch angle to calculate the DCM of the B frame with respect to the N frame: $C_n^b$, referring to Eq. (2.
16. Use the DCM of the B frame with respect to the N frame to calculate the initial quaternion for the SAAAEMS attitude updating algorithms.

In practice however, we do not directly calculate the SAAAEMS's three angles using the above procedure when the base is moving. We used it for SAAAEMS system initialization and to prove that our SAAAEMS approaches are mathematically feasible or the outputs of 2 accelerometers and 2 gyros contain sufficient information for the SAAAEMS innovative gyrocompassing.

In fact, the first gyrocompass in the world was a 2 degrees-of-freedom mechanical gyro with a pendulum attached to its inner gimbal for 2 degrees-of-freedom gravity sensing. The sensed gravity drives the gyro to point to the north (or south). In a practical system, owing to the presence of sensor errors and motion perturbations, the directly calculated $C_n^b$ or three angles may not be accurate enough to meet the requirements of system alignment. Therefore, we have to design a set of algorithms, usually using extended Kalman Filtering approaches, to estimate the discrepancy between the calculated $\hat{C}_n^b$ and the real one $C_n^b$. Or, to update the calculated $\hat{C}_n^b$, rendering it to converge towards the real $C_n^b$.

Analysis of the Static Processing Approach

The above described algorithms directly use the sensor outputs to calculate the unit's attitude. This is called a static processing approach, which is a straightforward explanation of the gyrocompassing principle. But in a practical gyrocompass system, we can not use the above described static approach to calculate the unit attitude angles because most times the assumed ideal conditions do not exist in a real application situation. For example, in a real system, the sensors always have different kinds of errors and the gyrocompass unit may be in angular motion in order to track a moving target or point to a different target successively.

The sensor outputs in a real SAAAEMS system can be described by the following equations.

Gyro Outputs:

$$\omega_o = \omega_{bi}^b + \varepsilon^b \qquad (28)$$
$$= \omega_{bn}^b + \omega_{ne}^b + \omega_{ei}^b + \varepsilon^b$$
$$= \omega_{bn}^b + C_n^b \omega_{ne}^n(V) + \omega_{ei}^b + \varepsilon^b$$
$$= \omega_{bn}^b + C_n^b \omega_{ne}^n(V) + C_n^b \Omega^n + \varepsilon^b$$

Compared to the ideal situation: $\omega_o = \omega_{bi}^b = C_n^b \Omega^n$

Accelerometer Outputs:

$$f_o = f^b \qquad (29)$$
$$= C_n^b f^n + \nabla^b$$
$$= C_n^b (\dot{V}^n + (\omega_{ne}^n(V) + 2\omega_{ei}^n) \times V^n - G^n) + \nabla^b$$

Compared to the ideal situation: $f_o = f^b = C_n^b(-G^n) = -C_n^b(G^n)$

In a practical pointing system, the effect of translational moving velocity is very small, so that the sensor outputs model can be simplified as follows.

Gyro Outputs:

$$\omega_o = \omega_{bi}^b + \varepsilon^b \qquad (30)$$
$$= \omega_{bn}^b + C_n^b \omega_{ne}^n(V) + C_n^b \Omega^n + \varepsilon^b$$
$$= \omega_{bn}^b + C_n^b \Omega^n + \varepsilon^b$$

where $\omega_{bn}^b$ is the unit (pointing system, the carrier) angular velocity with respect to the N frame (ground or the earth); $\Omega^n$ is the earth's angular velocity vector (resolved in the N frame). $\varepsilon^b$ is the generalized gyro error.

Accelerometer Outputs:

$$f_o = f^b \qquad (31)$$
$$= C_n^b f^n + \nabla^b$$
$$= C_n^b (\dot{V}^n + (\omega_{ne}^n(V) + 2\omega_{ei}^n) \times V^n - G^n) + \nabla^b$$
$$= C_n^b (\dot{V}^n - G^n) + \nabla^b$$
$$= C_n^b (a^n - G^n) + \nabla^b$$
$$= C_n^b a^n - C_n^b G^n + \nabla^b$$
$$= a^b - C_n^b G^n + \nabla^b$$

where $a^b$ is the unit translational acceleration with respect to the ground; $G^n$ is the local gravity acceleration (resolved in the N frame); $\nabla^b$ is the generalized accelerometer errors.

From the sensor model, we can see that in the gyro output ($\omega_o = \omega_{bn}^b + C_n^b \Omega^n + \varepsilon^b$), only $\Omega^n$ is the useful component for the gyrocompass processing. $\omega_{bn}^b$ and $\varepsilon^b$ are errors or interference to the system. $\omega_{bn}^b$ is cause by unit (carrier base) angular motion or angular vibration of the base. $\varepsilon^b$ is the generalized gyro error which includes bias, drift, scale factor, random noise, etc.

Similarly, in the accelerometer output ($f_o = a^b - C_n^b G^n + \nabla^b$) only $G^n$ is the useful component for the gyrocompass processing. $a^b$ and $\nabla^b$ are errors or interference to the system. $a^b$ is cause by unit (carrier base) translational acceleration or vibration of the base. $\nabla^b$ is the generalized accelerometer error which includes bias, drift, scale factor, random noise, etc.

If we want to calculate the unit attitude ($C_n^b$ or Euler angles) directly from the sensor output, the sensor errors and base motion interference will cause error to the calculation. In order to obtain a reasonably good attitude calculation, the sensor errors and base motion interference must be small enough compared to the useful components in the sensor outputs.

That is, the amplitude of the gyro error and base angular motion must be far smaller than the earth rate $\Omega$.

$$|C_n^b \Omega^n| = |\Omega^n| = \Omega >> |\omega_{bn}^b|$$

and $$\Omega >> |\varepsilon^b| \qquad (32)$$

and the amplitude of the accelerometer error and base motion acceleration must be far smaller than the gravity acceleration g.

$$|C_n^b G^n| = |G^n| = g >> |a^b|$$

and $$g >> |\nabla^b| \qquad (33)$$

In a practical gyrocompass system, the sensor accuracy is usually selected to have a generalized error less than 1 thousandth of the sensor input useful component (G or $\Omega$).

Gyro error: $|\varepsilon^b| < 0.001\Omega = 0.001 \times 15$ deg/hr=0.015 deg/hr Accelerometer error: $|\nabla^b| < 0.001$ g=1 mg Even with accurate enough sensors, the above static approach is still unable to avoid interference cause by the base motion. The angular motion restriction ($|\omega_{bn}^b| << \Omega = 15.04106864$ deg/hr=0.00417 deg/sec) is impractical for a real application. A very small angular motion will cause a big attitude estimation error. A real or usable pointing system must often make rotations in order to track a moving target or point to different targets successively.

The translation acceleration motion restriction ($|a^b| << g = 9.796527$ m/sec/sec) may be a little easier for a pointing system to satisfy, because the gyrocompass unit itself does not make intentional translation acceleration. But the angular motion of the unit still causes translation acceleration of an accelerometer, as long as the sensor sensitivity center is not on the rotation base (carrier center).

Therefore, we must use a kind of dynamic gyrocompassing approach, which is able to eliminate the effects of base motion interference or reduce it to an acceptable level. The following section presents a description and analysis of the SAAAEMS dynamic gyrocompassing processing algorithms.

A practical strapdown handheld gyrocompass must consider:

Base motion disturbance/interference—isolation and/or compensation. The base motion disturbance includes:
1. angular motion interference.
2. translational acceleration interference.

Sensor errors—calibration and/or compensation. The sensor errors include:
1. deterministic errors.
2. random errors.

The generalized sensor errors include:
Deterministic errors: constant bias, scale factor error, etc.
Bias drift induced by temperature change, base vibration rectification, etc.
Sensor noise including noise caused by base vibration, circuits and ADC.

Figure 5:
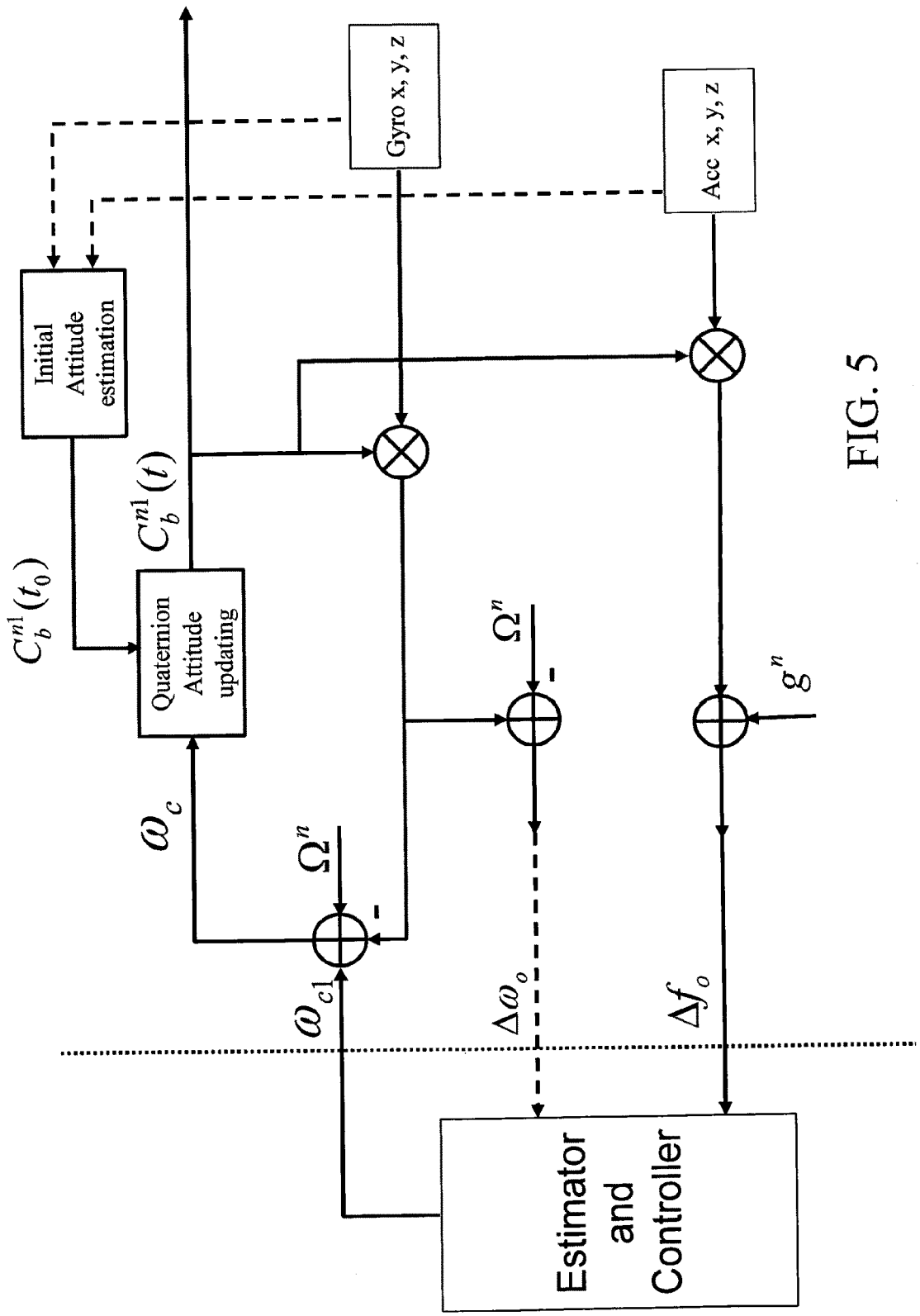
FIG. 5 is a block diagram illustrating System Processing Construction.

In a gimbaled gyrocompass or a platform INS, the angular velocity interference is isolated by gyro stabilization capability. In the strapdown gyrocompass, the angular velocity interference can be compensated in principle, because the accelerometers also contain the (redundant) angular information by sensing the gravity vector. In practice, a so-called mathematical (virtual) platform is introduced, which is "stabilized" and "converges" to the N frame, and thus the angular velocity interference is compensated/isolated, as depicted in FIG. 5.

According to the detected base motion condition, the gyrocompass system will change its structure:
Use a real MEMS gyro Z or reconstruct it from the DTG gyro X and Y.
Use the accelerometers for damping (correction) or ignore it. If accelerometer damping is used, accelerometer Z will be reconstructed from accelerometers X and Y.
If the acceleration is compensated, damping is used.

The gyrocompass system will switch between two operation modes:
Gyrocompassing mode.
AHRS mode (inertial stabilization mode).

The establishment of a mathematical platform also provides inertial attitude estimation which can purely depend on gyro measurements in a short period. Accelerometer data is used to correct the accumulated vertical attitude error caused by gyro error. If acceleration interference is detected, the accelerometer correction control is not used.

In a pointing system, usually there is no intentional translational motion. Most times, acceleration interference is small and is caused by angular motion when the system is slewing for moving target tracking or is in transit pointing to different targets. This angular motion related acceleration interference can be compensated or partially compensated.

If used on a moving base, the transformed gyro outputs can not be directly used as error measurement. Thus, angular motion interference does not appear in the error model. This means the base angular motion interference is isolated or compensated by the mathematical platform.

The transformed accelerometer outputs on the N1 frame are used as the error measurements. This gyrocompassing error system model is fully controllable and observable (when the system is not on the earth's poles).

Construction of the Dynamic Processing Algorithms

When the unit (base) is performing angular motion, the attitude of the unit is changing and thus the actual (real) unit attitude parameters ($C_n^b$ or Euler angles) is also changing or they are functions of time. Thus, we must assume that the estimate of $C_n^b$ (noted as $\hat{C}_n^b$) is a function of time, $\hat{C}_n^b = \hat{C}_n^b(t)$.

Then, the aim of the algorithm construction becomes: Construct a $\hat{C}_n^b(t)$ (or $\hat{C}_b^n(t)$) that tracks and converges to the actual $C_n^b(t)$ (or $C_b^n(t)$)

In a properly constructed system, $\hat{C}_n^b(t)$ is very close to $C_n^b(t)$ and in mathematical terms $\hat{C}_n^b(t)$ can be expressed as $C_n^b(t)$ multiplied by a DCM, with very small angle displacement. We have two choices to construct the estimate of $C_b^n(t)$:

$$\hat{C}_n^b(t) = C_n^{b1}(t) = C_b^{b1} C_n^b$$

or equivalently $$\hat{C}_b^n(t) = C_b^{n1}(t) = C_n^{n1} C_b^n \text{ or}$$

$$\hat{C}_n^b(t) = C_{n1}^b(t) = C_n^b C_{n1}^n \quad \text{(b 34)}$$

It is noted here that we introduced an imaginary frame, B1 or N1, which is also called a mathematical frame or virtual frame. In a practical system construction we choose the N1 frame, because:

B1 is tracking a moving frame B (unit) when the unit is rotating. Thus, it will lead to a more complex, time-varying system model.

Whereas N1 is tracking a fixed frame N, the local navigation frame, a leveled frame. Thus, it will lead to a simpler, time-unvarying system model.

More advantageously, N1 is a simulation of a physical inertially stabilized platform. It tries to track and stabilize on the fixed N frame. This will lead to a similar system model as a platform INS and many of the platform INS techniques can be transplanted and used for the strapdown gyrocompass system. We can consider the N1 frame as similar to the stabilized platform P in a platform INS or a platform gyrocompass.

In a properly constructed system, the N1 frame will track and converge to the N frame, and $C_b^{n1}(t)$ will track and converge to the actual $C_b^n(t)$. The N1 frame will be very close to the N frame, if the system is properly constructed, and thus, the relationship between N1 and N can be approximately represented by 3 small angles or a small angular vector:

$$\phi = \begin{bmatrix} \phi_x \\ \phi_y \\ \phi_z \end{bmatrix} \quad (35$$

and their DCM's are related by:

$$C_b^{n1}(t) = C_n^{n1} C_b^n \quad (36$$
$$= \begin{bmatrix} 1 & \phi_z & -\phi_y \\ -\phi_z & 1 & \phi_x \\ \phi_y & -\phi_x & 1 \end{bmatrix} C_b^n$$
$$= (I + [\Phi]) C_b^n$$

where $[\Phi]$ is the skew-symmetric (or antisymmetric) matrix of the vector $\phi$.

$$[\Phi] = \begin{bmatrix} 0 & \phi_z & -\phi_y \\ -\phi_z & 0 & \phi_x \\ \phi_y & -\phi_x & 0 \end{bmatrix} \quad (37)$$

Now, the aim of the $C_b^{n1}(t)$ construction becomes: construct $C_b^{n1}(t)$ and control $C_b^{n1}(t)$, letting $\phi \to 0$. Then, $C_b^{n1}(t) \to C_b^{n}(t)$.

The key question is how to construct a $C_b^{n1}(t)$ that will track and converge to the actual $C_b^{n}(t)$. The actual $C_n^{b}(t)$ is controlled by $\omega_{bn}^{b}$, the unit (pointing system, the carrier) angular velocity with respect to the N frame (ground or the earth). The relationship between $C_n^{b}(t)$ and $\omega_{bn}^{b}$ is governed by the following matrix differential equation:

$$\dot{C}_n^{b}(t) = [\omega_{bn}^{b}] C_n^{b}(t)$$

or equivalently $$\dot{C}_b^{n}(t) = [\omega_{nb}^{n}] C_b^{n}(t) \quad (38)$$

Similarly, we construct a command $\omega_c$ to update and control $C_b^{n1}(t)$ $$\dot{C}_b^{n1}(t) = [\omega_c] C_b^{n1}(t) \quad (39)$$

In order to achieve $C_b^{n1}(t) \to C_b^{n}(t)$, a necessary condition is that $\omega_c = \omega_{nb}^{n} = -\omega_{bn}^{n} = -C_b^{n}\omega_{bn}^{b}$, the relative angular velocity between the unit and the N frame, resolved in the N frame.

In a practical system, we do not directly know $\omega_{bn}^{n}$, the unit angular velocity with respect to the N frame. But, it is measured by the gyros:

$$\omega_o = \omega_{bn}^{b} C_n^{b} \Omega^n + \varepsilon^b \quad (40)$$

An estimate of $\omega_{bn}^{n}$ can be constructed by resolving the gyro outputs onto the N1 frame as $$\begin{aligned} C_b^{n1} \omega_o &= C_b^{n1} \omega_{bn}^{b} + C_b^{n1} C_n^{b} \Omega^n + C_b^{n1} \varepsilon^b \\ &= C_b^{n1} \omega_{bn}^{b} + C_n^{n1} \Omega^n + \varepsilon^{n1} \\ &= C_b^{n1} C_n^{b} \omega_{bn}^{n} + (I + [\Phi])\Omega^n + \varepsilon^{n1} \\ &= C_b^{n1} \omega_{bn}^{n} + (I + [\Phi])\Omega^n + \varepsilon^{n1} \\ &= C_b^{n1} \omega_{bn}^{n} + \Omega^n + [\Phi]\Omega^n + \varepsilon^{n1} \end{aligned} \quad (41)$$

Because we do not know the real $C_b^{n}(t)$, its estimate $C_b^{n1}(t)$ is used instead. A reasonable estimate of the $\omega_{bn}^{n}$ is derived as:

$$\begin{aligned} \omega_{bn}^{n} &= C_b^{n1} \omega_o - \Omega^n \\ &= C_n^{n1} \omega_{bn}^{n} + [\Phi]\Omega^n + \varepsilon^{n1} \\ &= \omega_{bn}^{n} + [\Phi]\omega_{bn}^{n} + [\Phi]\Omega^n + \varepsilon^{n1} \end{aligned} \quad (42)$$

We can see that the $\omega_{bn}^{n}$ estimate contains an error caused by the gyro error and the $C_b^{n}(t)$ estimate error, but it is a necessary component of the $C_b^{n1}(t)$ updating command. Therefore, at this point, we can construct the $C_b^{n1}(t)$ updating command as:

$$\omega_c = -\hat{\omega}_{bn}^{n} + \omega_{c1} = -C_b^{n1}\omega_o + \Omega^n + \omega_{c1} \quad (43)$$

where $\omega_{c1}$ is the additional $C_b^{n1}(t)$ updating command. Because the command component $\hat{\omega}_{bn}^{n}$ is used only to let $C_n^{n1}(t)$ to track the angular velocity of the $C_n^{n}(t)$, it can not guarantee that $C_b^{n1}(t)$ will converge to $C_n^{n}(t)$. The command component $\omega_{c1}$ is used to further control $C_b^{n1}(t)$ to converge to $C_b^{n}(t)$.

In the SAAAEMS approach a mathematical platform is introduced, and the base angular motion can be isolated, like a gyro-stabilized gimbaled platform. Thus the gyrocompassing can be performed even during a base slew or rotation. In practice, the base angular motion is usually accompanied by linear (translational) acceleration, which will interfere with the gyrocompassing. To eliminate the acceleration interference, the accelerometer feedback control can be cut off from the gyrocompassing loop when motion is detected. Then the gyrocompassing actually becomes an inertial AHRS system which is tracking the angular moving base and meanwhile with the earth rate compensated.

System Dynamic Error Model

In order to achieve $C_b^{n1}(t) \to C_b^{n}(t)$ or equivalently $\phi \to 0$, we must further construct $\omega_{c1}$ to control $\phi$. To use $\omega_{c1}$ to control $\phi$, we need to establish the relationship between them, which is usually called the system error control model.

As analyzed previously, the vector $\phi$ contains 3 small angles or is a small angular vector used to represent the relationship between N1 and N:

$$C_n^{n1} = \begin{bmatrix} 1 & \phi_z & -\phi_y \\ -\phi_z & 1 & \phi_x \\ \phi_y & -\phi_x & 1 \end{bmatrix} = (I + [\Phi]) \quad (44)$$

Since the N1 frame is very close to the N frame, the relative angular velocity between them can be expressed as the vector differential of $\phi$:

$$\vec{\phi} = \vec{\omega}_{n1n} = \vec{\omega}_{n1b} + \vec{\omega}_{bn} \quad (45)$$

Resolving this vector equation to the N1 frame, we get:

$$\begin{aligned} \dot{\phi} &= \omega_{n1n}^{n1} \\ &= \omega_{n1b}^{n1} + \omega_{bn}^{n1} \\ &= \omega_c + \omega_{bn}^{n1} \end{aligned} \quad (46)$$

From the construction of the $C_b^{n1}(t)$ updating command we have:

$$\begin{aligned} \omega_c &= -\hat{\omega}_{bn}^{n} + \omega_{c1} \\ &= -C_b^{n1}\omega_o + \Omega^n + \omega_{c1} \\ &= -\omega_{bn}^{n} - [\Phi]\omega_{bn}^{n} - [\Phi]\Omega^n - \varepsilon^{n1} + \omega_{c1} \\ &= -(I + [\Phi])\omega_{bn}^{n} - [\Phi]\Omega^n - \varepsilon^{n1} + \omega_{c1} \\ &= -\omega_{bn}^{n1} - [\Phi]\Omega^n - \varepsilon^{n1} + \omega_{c1} \end{aligned} \quad (47)$$

Combining the two equations we get:

$$\begin{aligned} \dot{\phi} &= -[\Phi]\Omega^n - \varepsilon^{n1} + \omega_{c1} \\ &= [\Omega^n]\phi - \varepsilon^{n1} + \omega_{c1} \end{aligned} \quad (48)$$

where $$\phi = \begin{bmatrix} \phi_x \\ \phi_y \\ \phi_z \end{bmatrix}$$

-continued $$[\Phi] = \begin{bmatrix} 0 & \phi_z & -\phi_y \\ -\phi_z & 0 & \phi_x \\ \phi_y & -\phi_x & 0 \end{bmatrix}$$

and $$\Omega^n = \begin{bmatrix} \Omega_x^n \\ \Omega_y^n \\ \Omega_z^n \end{bmatrix} = \begin{bmatrix} \Omega\cos\varphi \\ 0 \\ -\Omega\sin\varphi \end{bmatrix}$$

$$[\Omega^n] = \begin{bmatrix} 0 & \Omega_z^n & -\Omega_y^n \\ -\Omega_z^n & 0 & \Omega_x^n \\ \Omega_y^n & -\Omega_x^n & 0 \end{bmatrix}.$$

In the equation, $\epsilon^{n1}$ is the generalized gyro error resolved in the N1 frame.

This system dynamic error model reveals the relationship between the command $\omega_{c1}$ and the $C_b^n(t)$ estimate error $\phi$. It indicates that $\omega_{c1}$ can directly control the error $\phi$. Re-written in component form, it becomes:

$$\dot{\phi}_x = -\Omega \sin\phi\phi_y + \omega_{c1x} - \epsilon_x^{n1}$$

$$\dot{\phi}_y = \Omega \sin\phi\phi_x + \Omega \cos\phi\phi_z + \omega_{c1u} - \epsilon_y^{n1}$$

$$\dot{\phi}_z = -\Omega \cos\phi\phi_y + \omega_{c1z} - \epsilon_z^{n1} \tag{49}$$

System Observation Model

In order to control the error and let it converge to 0 ($\phi \to 0$), the error $\phi$ must be measured or observed. This is the basis for a closed-loop (feedback) control system.

In a gyrocompass system, gyros and accelerometers are the only information source, and the observation of the error $\phi$ has to be obtained from them. The gyro and accelerometer output is modeled as $$\omega_o = \omega_{bn}^b + C_n^b \Omega^n + \epsilon^b \tag{50}$$

$$f_o = a^b - C_n^b G^n + \nabla^b \tag{51}$$

Transforming the sensor outputs from the B frame to the established virtual platform, the N1 frame, we arrive at:

$$\begin{aligned} C_b^{n1}\omega_o &= C_b^{n1}\omega_{bn}^b + C_b^{n1}C_n^b\Omega^n + C_b^{n1}\epsilon^b \\ &= \omega_{bn}^{n1} + C_n^{n1}\Omega^n + \epsilon^{n1} \\ &= \omega_{bn}^{n1} + [\phi]\Omega^n + \Omega^n + \epsilon^{n1} \\ &= \omega_{bn}^{n1} - [\Omega^n]\phi + \Omega^n + \epsilon^{n1} \end{aligned} \tag{52}$$

$$\begin{aligned} C_b^{n1}f_o &= C_b^{n1}a^b - C_b^{n1}C_n^bG^n + C_b^{n1}\nabla^b \\ &= a^{n1} - C_n^{n1}G^n + \nabla^{n1} \\ &= a^{n1} - [\phi]G^n - G^n + \nabla^{n1} \\ &= a^{n1} + [G^n]\phi - G^n + \nabla^{n1} \end{aligned} \tag{53}$$

Then, we construct the observations equation as $$\Delta\omega_o = C_b^{n1}\omega_o - \Omega^n = \omega_{bn}^{n1} - [\Omega^n]\phi + \epsilon^{n1} \tag{54}$$

$$\Delta f_o = C_b^{n1}f_o + G^n = a^{n1} + [G^n]\phi + \nabla^{n1} \tag{55}$$

where $\omega_{bn}^{n1}$ is the base (unit) angular velocity interference resolved in the N1 frame. $a^{n1}$ is the base acceleration interference resolved in the N1 frame. $\nabla^{n1}$ is the generalized accelerometer error resolved in the N1 frame.

Under stationary condition and with ideal sensors, the observation equations becomes:

$$\Delta\omega_o = -[\Omega^n]\phi \tag{56}$$

$$\Delta f_o = [G^n]\phi \tag{57}$$

And, the error $\phi$ can be directly calculated from the observation outputs $\Delta\omega_o$ and $\Delta f_o$.

In practice, there are always sensor errors and most time base motion interference. For a pointing system used for moving target tracking, the gyro outputs can not be used for observation construction. The gyro outputs are used for angular motion tracking, instead (construction of command $\omega_c$). Only the accelerometer outputs can be used for $\phi$ estimation.

Re-writing $\Delta f_o = a^{n1} + [G^n]\phi + \nabla^{n1}$ in component form, we obtain:

$$\Delta f_{ox} = g\phi_y + a_x^{n1} + \nabla_x^{n1}$$

$$\Delta f_{ox} = -g\phi_x + a_y^{n1} + \nabla_y^{n1}$$

$$\Delta f_{oz} = a_z^{n1} + \nabla_z^{n1} \tag{58}$$

$\phi_x$ and $\phi_y$ can be estimated directly from $\Delta f_{ox}$ and $\Delta f_{oy}$. Combining the estimated $\phi_x$ and $\phi_y$ with the $\phi$ dynamic model, $\dot{\phi} = [\Omega^n]\phi - \epsilon^{n1} + \omega_{c1}$, and proper controller ($\omega_{c1}$) construction, $\phi_z$ can also be estimated.

A linear time-unvarying system model for the gyrocompass processing is:

System Error Dynamic Model $$\dot{\phi} = [\Omega^n]\phi - \epsilon^{n1} + \omega_{c1} \tag{59}$$

System Observation Model.

$$\Delta f_{ox} = g\phi_u + a_x^{n1} + \nabla_x^{n1}$$

$$\Delta f_{ox} = -g\phi_x + a_u^{n1} + \nabla_u^{n1} \tag{60}$$

Figure 6:
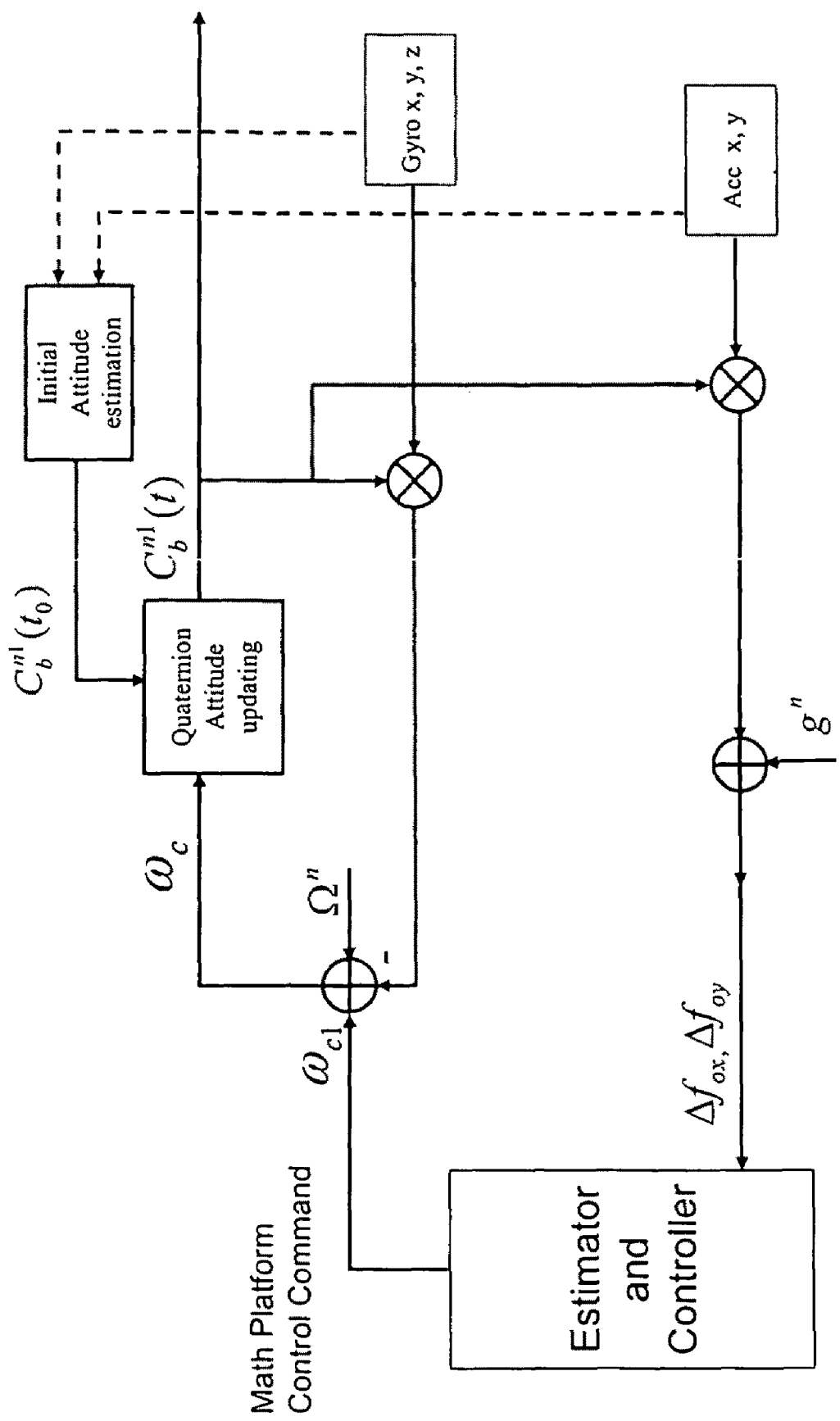
FIG. 6 is a block diagram illustrating Establishment of the Mathematical Platform (frame N1).

Based on this model, we are able to utilize a series of advanced system control and estimation approaches, such as Kalman filtering, optimal estimation, stochastic system control, etc., as shown in FIG. 6.

Linear Error Model and Closed-Loop Control Methods

A linear time-invariant system model for the gyrocompass process is depicted by the following equations.

Error dynamic model:

$$\dot{\phi} = [\Omega^n]\phi - \epsilon^{n1} + \omega_{c1} \tag{61}$$

where $$\phi = \begin{bmatrix} \phi_x \\ \phi_y \\ \phi_z \end{bmatrix},$$

$$[\Phi] = \begin{bmatrix} 0 & \phi_z & -\phi_y \\ -\phi_z & 0 & \phi_x \\ \phi_y & -\phi_x & 0 \end{bmatrix},$$

$$\Omega^n = \begin{bmatrix} \Omega_x^n \\ \Omega_y^n \\ \Omega_z^n \end{bmatrix} = \begin{bmatrix} \Omega\cos\varphi \\ 0 \\ -\Omega\sin\varphi \end{bmatrix},$$

and $$[\Omega^n] = \begin{bmatrix} 0 & \Omega_z^n & -\Omega_y^n \\ -\Omega_z^n & 0 & \Omega_x^n \\ \Omega_y^n & -\Omega_x^n & 0 \end{bmatrix}.$$

In the above equation, $\epsilon^{n1}$ is the generalized gyro error resolved in the N1 frame.

This system error dynamic model reveals the relationship between the commanded $\omega_{c1}$ and the $C_b^n(t)$ estimate error, $\phi$. It indicates that $\omega_{c1}$ can directly control the error $\phi$. Re-written in component form, it becomes:

$$\dot{\phi}_x = -\Omega \sin\phi\phi_y + \omega_{c1x} - \epsilon_x^{n1}$$

$$\dot{\phi}_y = \Omega \sin\phi\phi_x + \Omega \cos\phi\phi_z + \omega_{c1y} - \epsilon_y^{n1}$$

$$\dot{\phi}_z = -\Omega \cos\phi\phi_y + \omega_{c1z} - \epsilon_z^{n1} \quad (62)$$

The system error observation model is:

$$\Delta f_{ox} = g\phi_y + a_x^{n1} + \nabla_x^{n1}$$

$$\Delta f_{ox} = -g\phi_x + a_y^{n1} + \nabla_y^{n1} \quad (63)$$

where $a_x^{n1}$, $a_y^{n1}$ are the base (unit) linear/translational accelerations interference; $\nabla_x^{n1}$, $\nabla_y^{n1}$ are the generalized accelerometer errors resolved in the N1 frame.

Written in standard linear system form:

$$\dot{x} = Ax + Bu + W \quad (64)$$
$$y = Cx + V$$

$$x = \begin{bmatrix} \phi_x \\ \phi_y \\ \phi_z \end{bmatrix} \quad (65)$$

$$u = \begin{bmatrix} \omega_{c1x} \\ \omega_{c1y} \\ \omega_{c1z} \end{bmatrix} \quad (66)$$

$$y = \begin{bmatrix} \Delta f_{ox} \\ \Delta f_{oy} \end{bmatrix} \quad (67)$$

Based on this model, we are able to utilize a series of advanced system control and estimation approaches. We will use and compare two types of methods for the error estimation and control of the SAAAEMS gyrocompassing system:
Optimal stochastic control method.
Classic feedback control method.

Figure 7:
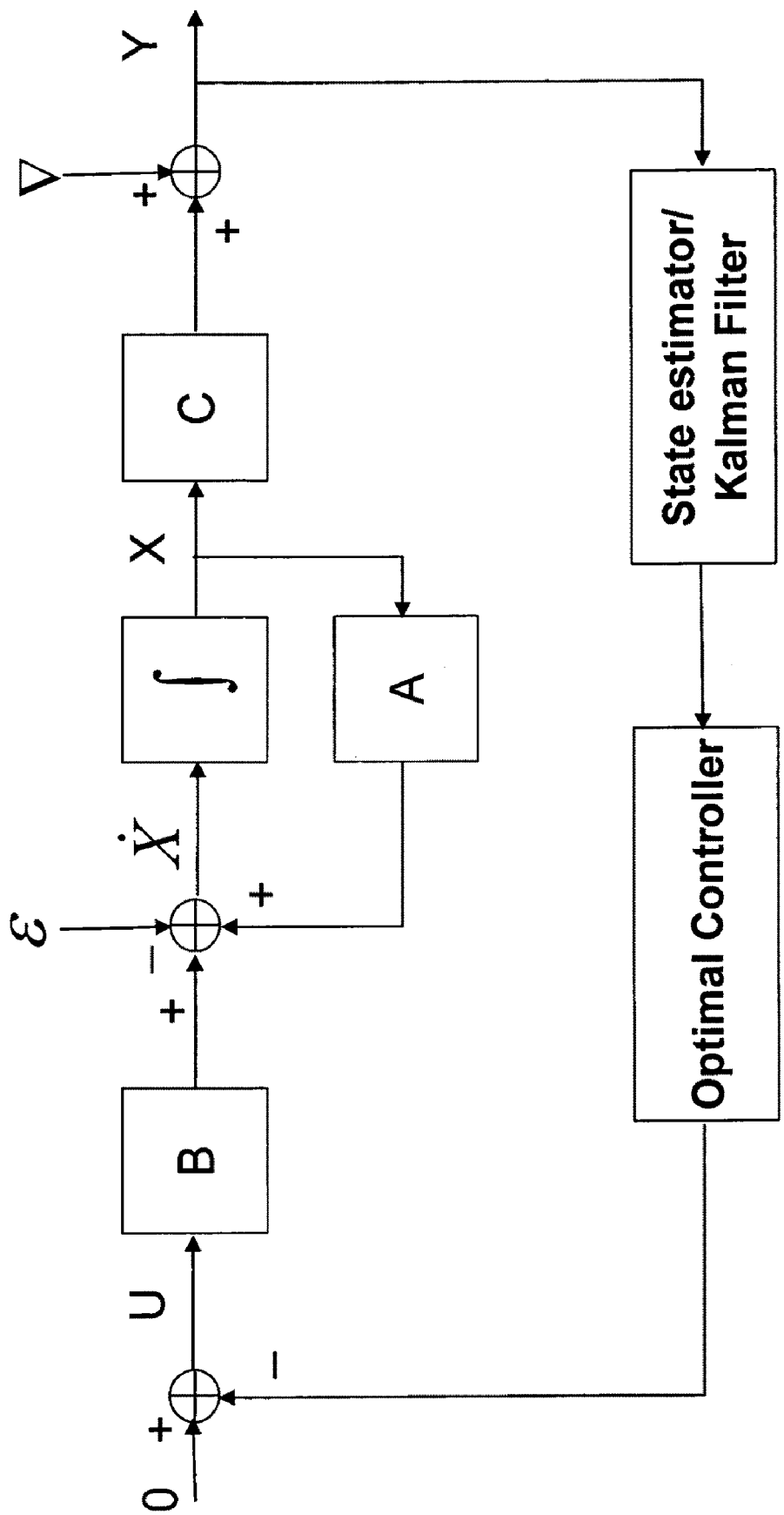
FIG. 7 is a block diagram illustrating Optimal Stochastic Control Method.

The optimal stochastic control method includes two parts: a Kalman filter for optimal estimate of the error state, and an optimal linear state feedback controller to drive the error state to converge to zero (or practically to a small value determined by uncompensated sensor error), as depicted in FIG. 7.

The advantages of the optimal stochastic control method include: a full use of the system information, better dynamic performance, higher accuracy and computerized design procedure. But it needs accurate system and error models, uses a complex algorithm, and induces heavy computation load, especially when the error states are augmented to a higher dimension.

The classic feedback control method uses traditional control system approaches. Since it is similar to a platform INS, the traditional INS gyrocompassing control algorithms can be readily used. Usually the classic feedback control method includes two parts:
In the level (X, Y) channels, use accelerometer feedback Y and proportional-integral (PI) algorithms to construct a feedback control system, letting the mathematical platform to be leveled.
Then use the X Y channel control commands to obtain an estimate of the azimuth/heading error, and then construct a feedback control for the Z channel, letting the heading error reduce to zero or to a small value determined by uncompensated sensor errors.

The establishment of the SAAAEMS mathematical platform and the SAAAEMS system model are the basis for the optimal estimation and feedback control of the SAAAEMS system.

Referring to FIG. 6, the following is a summary of the processing algorithm steps for the dynamic SAAAEMS gyrocompassing system:
1. Based on the static gyrocompasing process as the SAAAEMS system initialization method, use the calculated $\hat{C}_b^n(t)$ as the initial value of the $C_b^{n1}(t)$ DCM.
2. Use the initial $C_b^{n1}(t)$ to transform the calibrated and compensated gyro input data from the B frame to the N1 frame.
3. Use the initial $C_b^{n1}(t)$ to transform the calibrated and compensated accelerometer input data from the B frame to the N1 frame.
4. Send the X and Y components of the transformed accelerometer input data to the SAAAEMS estimator and controller to form the closed-loop control command.
5. Remove the earth angular velocity component from the transformed gyro input data.
6. Add closed-loop control command from the SAAAEMS estimator and controller to the transformed gyro input data, to form the total SAAAEMS attitude update command.
7. Use the total SAAAEMS attitude update command to update the system attitude by the quaternion attitude update equation.
8. Transform the updated quaternion attitude to DMC representation and get the updated DMC $C_b^{n1}(t)$.
9. Then loop back to the step 2, but use the updated $C_b^{n1}(t)$ (instead of the initial $C_b^{n1}(t)$) to transform the calibrated and compensated gyro input data from the B frame to the N1 frame.
10. Use the updated $C_b^{n1}(t)$ to transform the calibrated and compensated accelerometer input data from the B frame to the N1 frame.
11. Repeat the looped steps to obtain real-time continuous $C_b^{n1}(t)$ updates.
12. In the repeated loop, calculate the real-time continuous SAAAEMS pitch/elevation, roll and azimuth/heading angles for system output.

According to basic INS principles related to the steady state accuracy of gyrocompassing, the vertical and azimuth angle errors can be approximately estimated as:

$$\Delta\phi_{x,y} = \frac{\nabla}{g} \quad (68)$$

$$\Delta\phi_z = \frac{\varepsilon}{\Omega\cos\varphi} + tg\varphi\frac{\nabla}{g} \approx \frac{\varepsilon}{\Omega\cos\varphi}$$

where, $\nabla$—Uncompensated Accelerometer bias.
$\epsilon$—Uncompensated Gyro bias drift.
g—Gravity.
$\Omega$—Earth rate, 15.04106864 deg/hr.
$\phi$—Local latitude.

The requirement for gyro accuracy can be expressed as $$\epsilon = \Delta\phi_z \Omega \cos\phi \quad (69)$$

If the local latitude=34 degrees, to get an azimuth accuracy of 1 mil the uncompensated gyro drift should be less than:

$$\varepsilon = \Delta\phi_z \Omega \cos\varphi \quad (70)$$
$$= 1(\text{mil}) * 15.04(\text{deg/hr}) * \cos(34°)$$
$$\approx 0.001(\text{rad}) * 12.4(\text{deg/hr})$$
$$= 0.0124(\text{deg/hr})$$

That is, to achieve a steady state azimuth accuracy of 1 mil, the gyro errors need to be modeled, calibrated and compensated to reduce the uncompensated bias drift to about 0.01 degrees/hour. A 2 mil azimuth accuracy needs an uncompensated gyro drift of about 0.02 degrees/hour.

Point Direction Limit of the SAAAEMS

In the SAAAEMS system, we use only a 2 DOF gyro and accelerometer measurements, instead of conventional 2 DOF measurements. This poses a limit to the pointing direction of the system. It is proved that if the elevation/pitch angle is in ($-90°$, $+90°$) range and the roll/bank angle is also in ($-90°$, $+90°$) range, the SAAAEMS system can uniquely determine the vertical angles (elevation, roll) in the ($-90°$, $+90°$) range and azimuth angle in the ($0°$, $+360°$) range. In practical use this limit to the vertical angles is reasonable. The following presents an analysis of this limit.

Under ideal conditions, the inertial sensor outputs can be expressed as a vector function of the Euler angles:

$$f_o = -C_n^b G^n = -C_n^b(\theta_x, \theta_y, \theta_z) G^n \quad (71)$$

$$\omega_o = C_n^b \Omega^n = C_n^b(\theta_x, \theta_y, \theta_z) \Omega^n \quad (72)$$

Re-writing in component form, we have:
(a) Accelerometer Output:

$$f_{ox} = g \sin \theta_y$$

$$f_{oy} = -g \sin \theta_x \cos \theta_y$$

$$(f_{oz} = -g \cos \theta_x \cos \theta_y) \quad (73)$$

(b) Gyro Output:

$$\omega_{ox} = \Omega \cos \phi \cos \theta_y \cos \theta_z + \Omega \sin \phi \sin \theta_y$$

$$\omega_{oy} = -\Omega \cos \phi \cos \theta_x \sin \theta_z + \Omega \cos \phi \sin \theta_x \sin \theta_y \cos \theta_z - \Omega \sin \phi \sin \theta_x \cos \theta_y$$

$$(\omega_{oz} = \Omega \cos \phi \sin \theta_x \sin \theta_z + \Omega \cos \phi \cos \theta_x \sin \theta_y \cos \theta_z - \Omega \sin \phi \cos \theta_x \cos \theta_y) \quad (74)$$

From the two accelerometer outputs $f_{ox}$ and $f_{oy}$, the elevation/pitch and roll angles can be calculated as:

$$\sin \hat{\theta}_y = f_{ox}/g \quad (75)$$

The elevation/pitch is: $\hat{\theta}_y = \arcsin(f_{ox}/g)$. In order to obtain a unique elevation angle, the elevation angle must be limited to $\hat{\theta}_y \in (-90°, +90°)$.

$$\cos \hat{\theta}_y = +\sqrt{1 - (\sin \hat{\theta}_y)^2} > 0 \quad (76)$$

The roll angle is: $\hat{\theta}_x = \arcsin(-f_{oy}/(g \cos \hat{\theta}_y))$. In order to obtain a unique roll angle, the roll angle must be limited to $\hat{\theta}_x \in (-90°, +90°)$.

The third accelerometer output $f_{oz}$ is not used. In fact, it can be constructed by using the outputs $f_{ox}$ and $f_{oy}$:

$$\hat{f}_{oz} = -g \cos \hat{\theta}_x \cos \hat{\theta}_y \quad (77)$$

Based on the calculated elevation/pitch and roll angles, from the two gyro outputs $\omega_{ox}$ and $\omega_{oy}$, the heading/azimuth angle can be calculated, as follows.

First, from the gyro output $\omega_{ox}$ we have:

$$\cos \hat{\theta}_z = (\omega_{ox} - \Omega \sin \phi \sin \hat{\theta}_y)/\Omega \cos \phi \cos \hat{\theta}_y \quad (78)$$

Then, using the calculated $\cos \hat{\theta}_z$ and the gyro output $\omega_{oy}$ we further obtain:

$$\sin \hat{\theta}_z = -(\omega_{oy} - \Omega \cos \phi \sin \hat{\theta}_x \sin \hat{\theta}_y \cos \hat{\theta}_z + \Omega \sin \phi \sin \hat{\theta}_x \cos \hat{\theta}_u)/\Omega \cos \phi \cos \hat{\theta}_x \quad (79)$$

Now, from the calculated $\cos \hat{\theta}_z$ and $\sin \hat{\theta}_z$ we can get the heading/azimuth angle at any point (0 to 360 degrees) without singularity.

The third gyro output $\omega_{oz}$ is not used and it can be constructed by using the calculated Euler angles (obtained from the two accelerometer outputs $f_{ox}$ and $f_{oy}$, and the two gyro outputs $\omega_{ox}$ and $\omega_{oy}$):

$$\hat{\omega}_{oz} = \Omega \cos \phi \sin \hat{\theta}_x \sin \hat{\theta}_z + \Omega \cos \phi \cos \hat{\theta}_x \sin \hat{\theta}_y \cos \hat{\theta}_z - \Omega \sin \phi \cos \hat{\theta}_x \cos \hat{\theta}_y$$

Thus, from the above analysis, it is demonstrated that, in principle, the 2 DOF sensor measurements of the vectors G and Ω are adequate for realization of a strapdown gyrocompass, if the vertical angles (elevation, roll) is limited to the ($-90°$, $+90°$) range, and the 3rd sensor measurements can be reconstructed under the static conditions.

The Effects of Base Vibration and Motion Interference

Base motion and mechanical vibration are presented as interference to the gyrocompass. We introduce a mathematical platform to isolate the angular motion of the base. In fact, this uses the mathematical platform to separate the base angular motion and earth rate and uses the gyro-sensed base angular motion data to track the changing real attitude of the unit (base).

As long as the mathematical platform is established, the angular motion of the base can be isolated. To establish the mathematical platform, an initial angular position of the base must be established, which should have an accuracy of a few degrees. Thus the linear error model of the gyrocompass applies.

In practice, this initial condition is established autonomously by a so-called static gyrocompassing calculation by using the gyro and accelerometer output directly. At this stage, the static gyrocompassing calculation can not separate the earth's angular velocity and the base angular motion in the gyro outputs.

If during the initialization stage, the base is under continuous motion disturbance, such as disturbance by a wind caused vibration, there will be difficulty for autonomous gyrocompass initialization. Usually, the vertical initial angles can be estimated from the filtered accelerometer outputs, since in practice the disturbance and vibration caused acceleration is much smaller than the gravitational acceleration. But, for the azimuth initial angle, if there is angular disturbance and vibration, the induced angular rate is usually much greater than the earth rate ($\Omega = 15.04106864$ deg/hr=$0.00417$ deg/sec), because the earth rate is relatively very small.

In practice, if the base (unit) can be kept stationary for 1 to 2 minutes, the gyrocompass can autonomously obtain a coarse estimate as the initial condition to establish the mathematical platform and thus isolate the angular motion disturbance/interference. If the base is in continuous motion disturbance, we can use external information for mathematical platform initialization, for example, manually set an approximate azimuth angle, or use an external low accuracy backup devise such as a magnetic compass to automatically get a coarse initial azimuth angle. As long as the initial angle error is not too big, the next stage fine initialization process will be stable and the system error will converge to zero or a definite value. This means the gyrocompass system can "boot" itself from a low accuracy status to a higher accuracy status. If the initial angle error is too big, the states of the actual system error model will be in a highly non-linear region and the convergence will be slow, or even converge to other non-zero equilibrium points.

For the base angular motion disturbance and vibration, the frequency components that fall into the gyro bandwidth will be sensed and isolated. The higher frequency components are filtered, but they may be rectified by the DTG mechanism and presented as bias drift. This kind of error needs to be modeled and removed by calibration and compensation algorithms.

The acceleration interference is in principle a key practical consideration in gyrocompass processing. The acceleration interference can be induced by unit angular motion or a pure linear/translational motion. We use two methods to counter the acceleration interference: compensation, or switch the system mode to remove the accelerometer based system damping (correction). To detect a pure linear/translational motion, a third accelerometer or some external information is required.

For normal use conditions, in the pointing system, the base vibration and acceleration interference should not be a big issue, as long as the gyrocompass system is properly designed and operated. In fact, the gyrocompass unit used for pointing, especially a handheld unit, will have some benefits from the use conditions. For example, the unit is free to be in different angular positions, and in actual operation there are always times the unit is at a stationary or near stationary state. This kind of use conditions increase the observability of the sensor error sources and provide a basis for autonomous real-time in-use system calibration.

The Principle of the System Calibration Approach

Currently for small and relatively low-cost gyros used in the pointing system, sensor calibration is always required to remove or compensate various sensor errors, in order to achieve system accuracy requirements. Let us consider DTG as an example. A DTG of a nominal accuracy of 0.02 deg/hr, can have a zero offset of 2 deg/hr, unrepeated bias change of 0.5 deg/hr, temperature change caused bias drift of 1 deg/hr, and g-related bias change of 3 deg/hr. All or most of these sensor errors must be calibrated and compensated in a high accuracy application.

Laboratory tests are performed to establish the DTG error models for the deterministic error sources of the DTG, such as zero offset, bias and scale factor temperature models, and g-sensitivity model. The established sensor error models have been used in the system realization. But in practice, because of sensor aging, environmental change, or other unconsidered or uncontrollable factors, the error models can not totally compensate the sensor errors, once only, by the laboratory tests. Therefore in addition to the laboratory tests, the on-site or in-use calibration approaches are applied to the SAAAEMS system.

For practical reasons, the on-site or in-use calibration approaches must be easy to operate for the users, or be transparent to the users; that is, the system can perform the calibration automatically when it is possible to do so and does not need the intervention of the users. In fact, the gyrocompass unit used for pointing, especially a handheld unit or a tripod based unit, will typically, have some benefits from the use conditions for realization of the automatic system calibration approaches. For example, the handheld unit is free to move in different angular positions in 3-axis directions; the tripod based unit can rotate in one axis. And, in actual operation, there are times the unit is at a stationary or near stationary state. This kind of use conditions increases the observability of the sensor error sources and provides a basis for autonomous real-time in-use system calibration. The following is a brief description of the principle of the multi-position calibration approach.

For calibration on a static base, the gyro measurement model is expressed as:

$$\omega_o = K_{sf}\omega_{bi}^b + \varepsilon^b \qquad (80)$$
$$= B_o + K_{sf}\Omega^b + n$$

where $\varepsilon^b = B_o + n$. The gyro bias is represented by an uncompensated constant or slow change item plus a random item. In vector form, the measurement model is written as:

$$\begin{bmatrix} \omega_{ox} \\ \omega_{oy} \\ \omega_{oz} \end{bmatrix} = \begin{bmatrix} B_{0x} \\ B_{0y} \\ B_{0z} \end{bmatrix} + \begin{bmatrix} k_x & 0 & 0 \\ 0 & k_y & 0 \\ 0 & 0 & k_z \end{bmatrix} \begin{bmatrix} \Omega_x^b \\ \Omega_y^b \\ \Omega_z^b \end{bmatrix} + \begin{bmatrix} n_x \\ n_y \\ n_z \end{bmatrix} \qquad (81)$$

where $\Omega^b$ is the Earth's angular velocity vector measured by the sensor triad or the Earth's angular velocity vector expressed in the sensor coordinate system/frame B. For a specific location on the Earth's surface, the Earth's angular velocity vector is constant with respect to the local geographical frame N. Then the measurement model further becomes:

$$\omega_o = B_o + K_{sf}C_n^b\Omega^n + n \qquad (82)$$

where $\Omega^n$ is the Earth's angular velocity vector expressed in the N frame. For a fixed location, it is a constant vector. $C_n^b$ is the transformation direction cosine matrix (DCM) from the N frame to the B frame.

Before using a gyro triad in the system, the gyro sensor must be calibrated for bias and scale factor. In principle, for a tripod unit, when the unit rotates about the Z axis, on the level frame, the calibrated X Y gyro sensor values will plot a circle in the X-Y plane, with the center of the circle on the frame's original point.

From the X Y components values we can calculate the azimuth. For gyro calibration, the un-calibrated gyro triad will plot a spherical ellipse in the 3-D space. In the X-Y 2-D plane the plot is an ellipse. From the ellipse, we can obtain the sensor biases and scale factors. Applying the obtained biases and scale factors for calibration, we can get a transformed circle in the X-Y plane, with center of the circle on the frame's original point, which is suitable for azimuth calculation.

The objective of the gyro calibration is to estimate measurement bias, $B_0$, and measurement scale factor, K. If $B_0$ and K are obtained, we can calculate the ideal Earth's angular velocity measurement as follows:

$$\Omega^b = K_{sf}^{-1}(\omega_o - B_0) = C_n^b\Omega^n + n \qquad (83)$$

From the ideal Earth's angular velocity measurement $\Omega^b$, the heading of the sensor body frame can be obtained, whose information was contained in the $C_n^b$.

In practice, to calculate the heading, we do not need to know the absolute measurement scale factor $K_{sf}$. The relative values of three scale factors $k_x$, $k_y$, $k_z$ are required. Because the scale factors $k_x$, $k_y$, $k_z$ are constant as soon as the circuit of the gyro is assembled, in system calibration, we first perform a procedure to determine the relative values of the three scale factors and then use a set of calculated correction coefficients to make the three measurement scale factors equal.

$$\omega_c = K_c \omega_o = K_c B_0 + K_c K C_n^b \Omega^n + K_c n \quad (84)$$

where $$K_c K = \begin{bmatrix} k_{cx} & 0 & 0 \\ 0 & k_{cx} & 0 \\ 0 & 0 & k_{cx} \end{bmatrix} \begin{bmatrix} k_x & 0 & 0 \\ 0 & k_x & 0 \\ 0 & 0 & k_x \end{bmatrix} \quad (85)$$

$$= \begin{bmatrix} k_{cx}k_x & 0 & 0 \\ 0 & k_{cx}k_x & 0 \\ 0 & 0 & k_{cx}k_x \end{bmatrix}$$

$$= \begin{bmatrix} \bar{k} & 0 & 0 \\ 0 & \bar{k} & 0 \\ 0 & 0 & \bar{k} \end{bmatrix}$$

$$= \bar{k} \begin{bmatrix} 1 & 0 & 0 \\ 0 & 1 & 0 \\ 0 & 0 & 1 \end{bmatrix}$$

$$= \bar{k} I$$

Then, the corrected gyro measurement model becomes:

$$\omega_c = K_c B_0 + K_c K C_n^b \omega^n + K_c n \quad (86)$$
$$= \bar{B}_0 + \bar{k} C_n^b \Omega^n + n_c$$

If the noise is filtered or not considered in the analysis, the gyro measurement model can be expressed as:

$$\omega_c = \bar{B}_0 + \bar{k} C_n^b \pi^n \quad (87)$$

In this equation, $\bar{B}_0$, $\bar{k}$, and $\Omega^n$ are all constant and the measurement $\omega_c$ is only determined by $C_n^b$, the angular position of the sensor body frame with respect to the N frame.

For gyro measurement at a specific location, rotating the sensor triad, a series of gyro data can be acquired and they are expressed as:

$$\omega_c(i) = \bar{B}_0 + \bar{k} C_n^b(i) \Omega^n \quad (88)$$

where i is the sample serial number; $\omega_c(i)$ is the ith data sample acquired when the sensor body is at the ith position that is determined by the DCM $C_n^b(i)$ Because $\bar{B}_0$, $\bar{k}$, and $\Omega^n$ are all constant, there is the following relationship:

$$\|\omega_c(i) - \bar{B}_0\| = \|\bar{k} C_n^b(i) \Omega^n\| = \|\bar{k}\| \|\Omega^n\| = R = constant \quad (89)$$

If we express the gyro measurement in a Cartesian coordinate system (x,y,z), then:

$$\omega_c(i) = \begin{bmatrix} x_i \\ y_i \\ z_i \end{bmatrix}, B_0 = \begin{bmatrix} a \\ b \\ c \end{bmatrix} \quad (90)$$

and $$\sqrt{(x_i - a)^2 + (y_i - b)^2 + (z_i - c)^2} = R \quad (91)$$

or $$(x_i - a)^2 + (y_i - b)^2 + (z_i - c)^2 = R^2 \quad (92)$$

Figure 8:
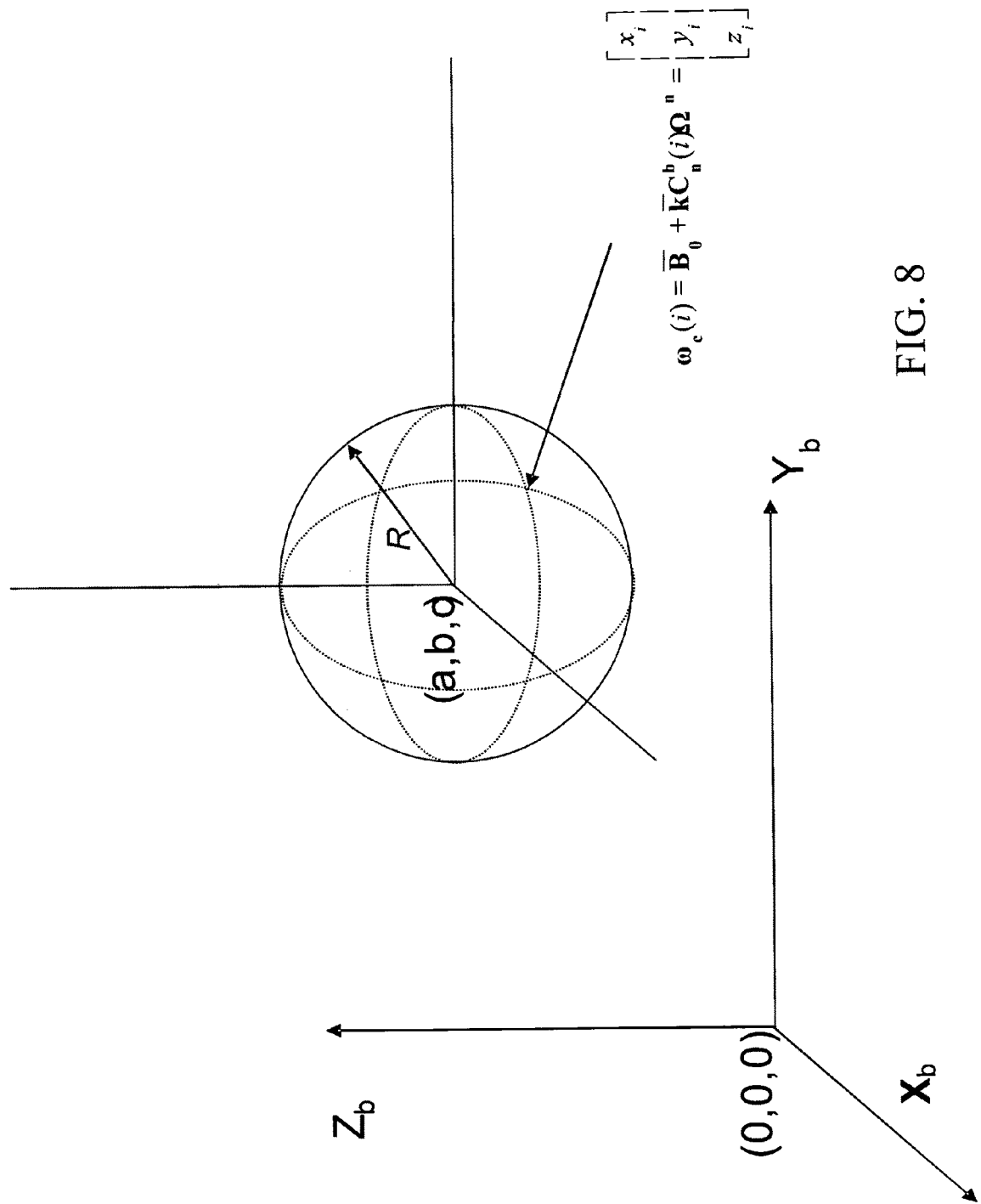
FIG. 8 depicts the Characteristic of the Gyro Measurements in Calibration.

This means that the point represented by the gyro measurement data in the Cartesian coordinate system is on the surface of a sphere with (a,b,c) as center, which is determined by sensor bias, and R as radius, which is determined by the sensor scale factor and $\Omega$, as shown in FIG. 8.

Therefore, the objective of the gyro calibration can be reiterated as to estimate the sphere center (a,b,c) and radius R under the condition that we know the position of many points on the surface of the sphere.

$$(x_n - a)^2 + (y_n - b)^2 + (z_n - c)^2 = R^2$$

In principle, if n is greater or equal to 4, this problem can be resolved. That is, 4 points which are not on the same plane can determine a sphere. In practice, however, because there is noise in the gyro measurements, we must use a large number of measurements, for example 50 to 150 at each point, to filter out noise and estimate a more accurate gyro measurement.

For 3D calibration, at least four static positions are required. For 2D calibration, at least three static positions are required. If more than adequate positions are obtained, then we can use an optimal estimation method to enhance the calibration accuracy.

Then, the basic calculation is the resolution of the 4 equation problem:

$$(x_1 - a)^2 + (y_1 - b)^2 + (z_1 - c)^2 = R^2 \quad (93)$$
$$\vdots$$
$$(x_4 - a)^2 + (y_4 - b)^2 + (z_4 - c)^2 = R^2$$

Or written in a generic form:

$$f_1(a, b, c, R) = (x_1 - a)^2 + (y_1 - b)^2 + (z_1 - c)^2 - R^2 = 0 \quad (94)$$
$$\vdots$$
$$f_4(a, b, c, R) = (x_4 - a)^2 + (y_4 - b)^2 + (z_4 - c)^2 - R^2 = 0$$

Denoting the unknowns a, b, c, R as a vector:

$$r = \begin{bmatrix} a \\ b \\ c \\ R \end{bmatrix}$$

The above 4 equations are expressed in a compact vector form as:

$$F(r) = \begin{bmatrix} f_1(a, b, c, R) \\ f_2(a, v, c, R) \\ f_3(a, b, c, R) \\ f_4(a, b, c, R) \end{bmatrix} = \begin{bmatrix} f_1(r) \\ f_2(r) \\ f_3(r) \\ f_4(r) \end{bmatrix} = 0 \quad (95)$$

The solution of r is obtained by an iteration procedure derived from the vector form of the Newtonian Method:

$$r_n = r_{n-1} - \left(\frac{\partial f}{\partial r}\right)^{-1} F(r_{n-1}) \quad (96)$$

where $$\frac{\partial f}{\partial r} = \begin{bmatrix} \frac{\partial f_1}{\partial a} & \frac{\partial f_1}{\partial b} & \frac{\partial f_1}{\partial c} & \frac{\partial f_1}{\partial R} \\ \frac{\partial f_2}{\partial a} & \frac{\partial f_2}{\partial b} & \frac{\partial f_2}{\partial c} & \frac{\partial f_2}{\partial R} \\ \frac{\partial f_3}{\partial a} & \frac{\partial f_3}{\partial b} & \frac{\partial f_3}{\partial c} & \frac{\partial f_3}{\partial R} \\ \frac{\partial f_4}{\partial a} & \frac{\partial f_4}{\partial b} & \frac{\partial f_4}{\partial c} & \frac{\partial f_4}{\partial R} \end{bmatrix} \quad (97)$$

The convergence of this iteration procedure has been mathematically proved and the $r_n$ series converges to the real solution of the equation.

In a practical SAAAEMS system the steps of the calibration process can be summarized as follows:
1. Power on the SAAAEMS system and position it on a stationary base.
2. Wait 2 to 3 minutes for gyros to fully start.
3. Perform ADC to get two channel gyro measurement data.
4. Process the gyro measurement data by two (X, Y) low-pass filters.
5. Average the gyro data over 10 to 20 seconds time period.
6. Use the standard deviation of the gyro data over 10 to 20 seconds to verify if the SAAAEMS system is really on a stationary base.
7. Save the obtained data as group 1.
8. Move the SAAAEMS unit to the second angular position and on the stationary base.
9. Process the gyro measurement data by two (X, Y) low-pass filters.
10. Average the gyro data over 10 to 20 seconds time period.
11. Use the standard deviation of the gyro data over 10 to 20 seconds to verify if the SAAAEMS system is really on a stationary base.
12. Save the obtained data as group 2.
13. Repeat step 8 to step 12 until data group 4 is obtained.
14. Construct the initial vector r which includes the initial estimates of the gyro bias.
15. Use the obtained 4 groups data to construct initial F(r) matrix, referring to Eq. (94.
16. Use the obtained 4 groups data to construct the initial $$\frac{\partial f}{\partial r}$$

matrix, referring to Eq. (97.
17. Determine the non-singularity of the matrix $$\frac{\partial f}{\partial r}.$$

18. If the matrix $$\frac{\partial f}{\partial r}$$

is non-singular, calculate its inverse matrix.
19. Use the inverse matrix and F(r) matrix to get the updated vector r.
20. Loop back to step 14, but use the updated vector r, instead of the initial vector r and the obtained 4 groups data, to construct the updated F(r) matrix, referring to Eq. (94.
21. Use the updated vector r and the obtained 4 groups data to construct the updated $$\frac{\partial f}{\partial r}$$

matrix, referring to Eq. (97.

22. Determine the non-singularity of the matrix $$\frac{\partial f}{\partial r}.$$

23. If the matrix $$\frac{\partial f}{\partial r}$$

is non-singular, calculate its inverse matrix.
24. Use the inverse matrix and F(r) matrix to get the new updated vector r.
25. Repeat steps 20 to 24 20 times, until r converges to a near constant vector, which are the gyro biases we want from the calibration procedure.

As we discussed above, this multi-position calibration method does not need to know the stop position of the unit. The one requirement is that the unit must be stationary, since we need the reference to the Earth's angular velocity as the gyro input. Thus, for an automatic calibration procedure, the unit motion state must be determined to be stationary by internal or external information. And, the other requirement is that for a 3D calibration, the gyro 4 measurement points must not be on the same plane. An algorithm has been devised to judge the resolvability or the singularity of the data groups.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A self-calibrated azimuth and attitude accuracy enhancing system, which is a self-contained system, comprising:
two kinds of inertial sensors only, wherein the first kind of inertial sensor comprises a first one-axis gyro measuring an inertial angular rate; and a second one-axis gyro measuring an inertial angular rate wherein said first one-axis gyro and said second one-axis gyro are not identical in direction; wherein the second kind of inertial sensor comprises a first accelerometer measuring an acceleration; and a second accelerometer measuring an acceleration wherein said first accelerometer and said second accelerometer are not identical in direction; and
a system processor processing said measurements of said first one-axis gyro, said second one-axis gyro, said first accelerometer, and said second accelerometer for determining an azimuth and attitude where said system is located through gyro-compassing processing based on measurement of the earth's angular rate and gravity for obtaining the true north of a carrier of said system without magnetic interference and GPS signal jamming.
2. The system, as recited in claim 1, wherein the first kind of inertial sensor further comprises a third gyro for said system to work in dynamic state.

3. The system, as recited in claim 2, wherein said third gyro is a MEMS gyro.

4. The system, as recited in claim 3, wherein said first one-axis gyro, said second one-axis gyro, said first accelerometer, and said second accelerometer are measuring an earth's angular velocity vector and a local gravity force vector.

5. The system, as recited in claim 4, further comprising:
one or more sensor signal filters for filtering signals of said first one-axis gyro, said second one-axis gyro, said first accelerometer, and said second accelerometer; and
an ADC (analog/digital convertor) circuit converting analog signals of said first one-axis gyro, said second one-axis gyro, said first accelerometer, and said second accelerometer into digital signals and feeding said digital signals into said system processor.

6. The system, as recited in claim 1, wherein said first one-axis gyro and said second one-axis gyro is a two-axis gyro.

7. The system, as recited in claim 2, wherein said first one-axis gyro and said second one-axis gyro is a two-axis gyro.

8. The system, as recited in claim 5, wherein said first one-axis gyro and said second one-axis gyro is a two-axis gyro.

9. A self-calibrated azimuth and attitude accuracy enhancing method, comprising steps of:
(a) powering on a SAAAEMS (self-calibrated azimuth and attitude accurate enhancing method and system) system and positioning said system on a stationary base;
(b) waiting for a predetermined period of time for gyros to fully start;
(c) getting two channel gyro and two channel accelerometer measurement data;
(d) performing sensor calibration and error compensation for both two channel gyro and two channel accelerometer measurement data by the following steps:
(d1) positioning said SAAAEMS system on a stationary base;
(d2) waiting for a predetermined period of time for gyros to fully start;
(d3) performing ADC to get two channel gyro measurement data;
(d4) processing said gyro measurement data by two (X, Y) low-pass filters;
(d5) averaging said gyro data over a predetermined time period;
(d6) using said standard deviation of said gyro data over a predetermined time period to verify if said SAAAEMS system is really on a stationary base;
(d7) saving said obtained data as group 1;
(d8) moving said SAAAEMS system to a second angular position and on a stationary base;
(d9) repeating step (d2) to step (d6), saving said obtained data as group 2;
(d10) moving said SAAAEMS system to a third angular position and on a stationary base;
(d11) repeating step (d2) to step (d6), saving said obtained data as group 3;
(d12) moving said SAAAEMS system to a forth angular position and on a stationary base;
(d13) repeating step (d2) to step (d6), saving said obtained data as group 4;
(d14) constructing an initial vector r which includes an initial estimates of a gyro bias;
(d15) using said obtained 4 groups data to construct initial F(r) matrix;
(d16) using said obtained 4 groups data to construct an initial $$\frac{\partial f}{\partial r}$$

matrix;
(d17) determining a non-singularity of said matrix $$\frac{\partial f}{\partial r};$$

(d18) calculating an inverse matrix thereof if said matrix $$\frac{\partial f}{\partial r}$$

is non-singular;
(d19) obtaining updated vector r using said inverse matrix and F(r);
(d20) using said updated vector r and said obtained 4 groups data to construct said updated F(r) matrix;
(d21) using said updated vector r and said obtained 4 groups data to construct said updated $$\frac{\partial f}{\partial r}$$

matrix;
(d22) determining said non-singularity of said matrix $$\frac{\partial f}{\partial r};$$

(d23) calculating an inverse matrix thereof if said matrix $$\frac{\partial f}{\partial r}$$

is non-singular;
(d24) using said inverse matrix and said F(r) matrix to get a new updated vector r; and
(d25) repeating said step (d20) to said step (d24) a predetermined number of times, until r converges to a near constant vector, which are the gyro biases from the calibration procedure;
(e) performing low pass filtering for both two channel gyro and two channel accelerometer measurement data;
(f) calculating the initial SAAAEMS unit attitude and heading/azimuth using said filtered two channel gyro and two channel accelerometer measurement data by the following steps:
(f1) constructing an intermediate vector $I^n$ using local gravity and local earth velocity vectors;
(f2) construct an intermediate vector $I^b$ using said two channel gyro and said two channel accelerometer measurement data;
(f3) constructing an intermediate matrix in the N frame using the local gravity and local earth velocity vectors and constructed intermediate vector $I^n$;

(f4) constructing an intermediate matrix in the B frame using said two channel gyro and said two channel accelerometer measurement data and constructed intermediate vector $I^b$;

(f5) testing non-singularity of said constructed intermediate matrix in said N frame;

(f6) calculating DCM (Direction Cosine Matrix) of said B frame with respect to said N frame $C_n^b$ using said constructed intermediate matrix in said N frame and the constructed intermediate matrix in said B frame; and (f7) calculating the initial quaternion for said SAAAEMS attitude updating algorithms using said DCM of said B frame with respect to said N frame; and (g) repeating from step (c) and obtaining real-time continuous SAAAEMS unit initial attitude and heading/azimuth, until said system enters into a dynamic gyrocompassing operation mode.

10. The method as recited in claim 9, further comprising the steps of:

(h) using said calculated $\hat{C}_b^n(t)$ as an initial value of said $C_b^{n1}(t)$ DCM based on said static gyrocompasing process as said SAAAEMS system initialization method;

(i) using said initial $C_b^{n1}(t)$ to transform said calibrated and compensated gyro input data from said B frame to a N1 frame;

(j) using said initial $C_b^{n1}(t)$ to transform said calibrated and compensated accelerometer input data from said B frame to said N1 frame;

(k) sending X and Y components of said transformed accelerometer input data to SAAAEMS estimator and controller to form a closed-loop control command;

(l) removing an earth angular velocity component from said transformed gyro input data;

(m) adding closed-loop control command from said SAAAEMS estimator and controller to said transformed gyro input data, to form a total SAAAEMS attitude update command;

(n) using said total SAAAEMS attitude update command to update said system attitude by an quaternion attitude update equation;

(o) transforming said updated quaternion attitude to DMC representation and get an updated DMC $C_b^{n1}(t)$;

(p) looping back to the step (i), using said updated $C_b^{n1}(t)$ to transform said calibrated and compensated gyro input data from said B frame to said N1 frame;

(q) using said updated $C_b^{n1}(t)$ to transform said calibrated and compensated accelerometer input data from said B frame to said N1 frame;

(r) repeating said step (i) to said step (q) to obtain real-time continuous $C_b^{n1}(t)$ updates; and (s) calculating a real-time continuous SAAAEMS pitch/elevation, roll and azimuth/heading angles for system output during the loop.

11. A self-calibrated azimuth and attitude accuracy enhancing method, comprising steps of:

(a) powering on a SAAAEMS (self-calibrated azimuth and attitude accurate enhancing method and system) system and positioning said system on a stationary base;

(b) waiting for a predetermined period of time for gyros to fully start;

(c) getting two channel gyro and two channel accelerometer measurement data;

(d) performing sensor calibration and error compensation for both two channel gyro and two channel accelerometer measurement data by the following steps:

(d1) positioning said SAAAEMS system on a stationary base;

(d2) waiting for a predetermined period of time for gyros to fully start;

(d3) performing ADC to get two channel gyro measurement data;

(d4) processing said gyro measurement data by two (X, Y) low-pass filters;

(d5) averaging said gyro data over a predetermined time period;

(d6) using said standard deviation of said gyro data over a predetermined time period to verify if said SAAAEMS system is really on a stationary base;

(d7) saving said obtained data as group 1;

(d8) moving said SAAAEMS system to a second angular position and on a stationary base;

(d9) repeating step (d2) to step (d6), saving said obtained data as group 2;

(d10) moving said SAAAEMS system to a third angular position and on a stationary base;

(d11) repeating step (d2) to step (d6), saving said obtained data as group 3;

(d12) moving said SAAAEMS system to a forth angular position and on a stationary base;

(d13) repeating step (d2) to step (d6), saving said obtained data as group 4;

(d14) constructing an initial vector r which includes an initial estimates of a gyro bias;

(d15) using said obtained 4 groups data to construct initial F(r) matrix;

(d16) using said obtained 4 groups data to construct an initial $$\frac{\partial f}{\partial r}$$

matrix;

(d17) determining a non-singularity of said matrix $$\frac{\partial f}{\partial r};$$

(d18) calculating an inverse matrix thereof if said matrix $$\frac{\partial f}{\partial r}$$

is non-singular;

(d19) obtaining updated vector r using said inverse matrix and F(r);

(d20) using said updated vector r and said obtained 4 groups data to construct said updated F(r) matrix;

(d21) using said updated vector r and said obtained 4 groups data to construct said updated $$\frac{\partial f}{\partial r}$$

matrix;

(d22) determining said non-singularity of said matrix $$\frac{\partial f}{\partial r};$$

(d23) calculating an inverse matrix thereof if said matrix $$\frac{\partial f}{\partial r}$$

is non-singular;
(d24) using said inverse matrix and said F(r) matrix to get a new updated vector r; and
(d25) repeating said step (d20) to said step (d24) a predetermined number of times, until r converges to a near constant vector, which are the gyro biases from the calibration procedure;
(e) performing low pass filtering for both two channel gyro and two channel accelerometer measurement data;
(f) calculating the initial SAAAEMS unit attitude and heading/azimuth using said filtered two channel gyro and two channel accelerometer measurement data by the following steps:
(f1') scaling an accelerometer X data;
(f2') obtaining a sine function of pitch angle using said scaled accelerometer X data;
(f3') testing if the absolute value of said scaled accelerometer X data is less than 1;
(f4') discarding said scaled accelerometer X data if it is greater than 1;
(f5') obtaining a pitch angle value using said sine function of said pitch angle if said test is passed;
(f6') calculating a cosine valued of said pitch angle;
(f7') scaling an accelerometer Y data;
(f8') obtaining a sine value of a roll angle using said scaled accelerometer Y data and the cosine value of said pitch angle;
(f9') testing if the absolute value of said sine value of the roll angle is less than 1;
(f10') discarding said absolute value of said sine value if it is grater than 1;
(f11') obtaining a roll angle value using the sine function of roll angle if said test is passed;
(f12') obtaining a cosine value of said cosine heading/azimuth value using said gyro X measurement data, said local geographical data, and said calculated cosine value and said sine value of said pitch angle;
(f13') obtaining a sine value of said cosine heading/azimuth value using said gyro Y measurement data, said local geographical data, said calculated cosine value and said sine value of the roll angle, and said calculated cosine value and said sine value of said pitch angle;
(f14') testing if the absolute value of said sine value and said cosine of said heading/azimuth angle is less than 1;
(f15') discarding said the data If it is greater than 1;
(f16') performing normalization of said sine value and said cosine of said heading/azimuth angle, to reduce the error caused by sensor error or computation if said test is passed;
(f17') obtaining a full range (0, 360) degrees heading/azimuth angle using said sine value and said cosine value of said heading/azimuth angle;
(f18') calculating a DCM of said B frame with respect to said N frame: $C_n^b$, using said calculated heading/azimuth angle, said roll angle and said pitch; and
(f19') calculating an initial quaternion for said SAAAEMS attitude updating algorithms using said DCM of said B frame with respect to said N frame; and
(g) repeating from step (c) and obtaining real-time continuous SAAAEMS unit initial attitude and heading/azimuth, until said system enters into a dynamic gyrocompassing operation mode.

12. The method as recited in claim 11, further comprising the steps of:
(h) using said calculated a: $\hat{C}_b^n(t)$ as an initial value of said $C_b^{n1}(t)$ DCM based on said static gyrocompasing process as said SAAAEMS system initialization method;
(i) using said initial $C_b^{n1}(t)$ to transform said calibrated and compensated gyro input data from said B frame to a N1 frame;
(j) using said initial $C_b^{n1}(t)$ to transform said calibrated and compensated accelerometer input data from said B frame to said N1 frame;
(k) sending X and Y components of said transformed accelerometer input data to SAAAEMS estimator and controller to form a closed-loop control command;
(l) removing an earth angular velocity component from said transformed gyro input data;
(m) adding closed-loop control command from said SAAAEMS estimator and controller to said transformed gyro input data, to form a total SAAAEMS attitude update command;
(n) using said total SAAAEMS attitude update command to update said system attitude by an quaternion attitude update equation;
(o) transforming said updated quaternion attitude to DMC representation and get an updated DMC $C_b^{n1}(t)$;
(p) looping back to the step (i), using said updated $C_b^{n1}(t)$ to transform said calibrated and compensated gyro input data from said B frame to said N1 frame;
(q) using said updated $C_b^{n1}(t)$ to transform said calibrated and compensated accelerometer input data from said B frame to said N1 frame;
(r) repeating said step (i) to said step (q) to obtain real-time continuous $C_b^{n1}(t)$ updates; and
(s) calculating a real-time continuous SAAAEMS pitch/elevation, roll and azimuth/heading angles for system output during the loop.

* * * * *